United States Patent
Hirashima et al.

(10) Patent No.: US 9,153,205 B2
(45) Date of Patent: Oct. 6, 2015

(54) DISPLAY DEVICE HAVING A GENERATOR FOR GENERATING RGBW SIGNALS BASED ON UPPER AND LOWER LIMIT VALUE CALCULATOR AND DISPLAY METHOD THEREOF

(75) Inventors: Tsuyoshi Hirashima, Osaka (JP); Haruo Yamashita, Osaka (JP); Takeshi Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 92 days.

(21) Appl. No.: 13/992,947

(22) PCT Filed: Nov. 30, 2011

(86) PCT No.: PCT/JP2011/006698
§ 371 (c)(1),
(2), (4) Date: Jun. 10, 2013

(87) PCT Pub. No.: WO2012/124003
PCT Pub. Date: Sep. 20, 2012

(65) Prior Publication Data
US 2013/0257924 A1    Oct. 3, 2013

(30) Foreign Application Priority Data

Mar. 16, 2011    (JP) ................. 2011-058126

(51) Int. Cl.
*G09G 3/36* (2006.01)
*G09G 5/02* (2006.01)
(Continued)

(52) U.S. Cl.
CPC .. *G09G 5/02* (2013.01); *G09G 5/04* (2013.01); *H04N 9/67* (2013.01); *H04N 9/68* (2013.01); *G09G 2300/0452* (2013.01); *G09G 2320/0242* (2013.01); *G09G 2340/06* (2013.01)

(58) Field of Classification Search
CPC .............. G09G 3/2003; G09G 3/2074; G09G 2300/0439–2300/0443
USPC .................................................. 345/88, 690
See application file for complete search history.

(56) References Cited

U.S. PATENT DOCUMENTS

2006/0256054 A1* 11/2006 Baek ................................ 345/88
2006/0268003 A1* 11/2006 Tanase et al. .................. 345/603
(Continued)

FOREIGN PATENT DOCUMENTS

JP    2004-286814    10/2004
JP    2007-206560    8/2007
(Continued)

OTHER PUBLICATIONS

International Search Report issued Dec. 27, 2011 in International (PCT) Application No. PCT/JP2011/006698.

*Primary Examiner* — Long D Pham
(74) *Attorney, Agent, or Firm* — Wenderoth, Lind & Ponack, L.L.P.

(57) ABSTRACT

A display device includes a display portion having red, green, blue and white sub pixels, a converter generating red, green and blue conversion signals using a brightness ratio from a ratio storage, an upper limit value calculator calculating an upper limit value of a display brightness of the white sub pixel using the red, green and blue conversion signals and the brightness ratio, a lower limit value calculator calculating a lower limit value of the display brightness of the white sub pixel using the red, green and blue conversion signals and the brightness ratio, and a white control signal generator generating a white output control signal for controlling the display brightness of the white sub pixel such that the display brightness is not more than the upper limit value and not less than the lower limit value, and outputting the generated white output control signal to the display portion.

10 Claims, 13 Drawing Sheets

(51) Int. Cl.
*H04N 9/67* (2006.01)
*H04N 9/68* (2006.01)
*G09G 5/04* (2006.01)

(56) References Cited

U.S. PATENT DOCUMENTS

2008/0180384 A1* 7/2008 Aoki et al. .................... 345/102
2009/0207182 A1 8/2009 Takada et al.
2009/0322802 A1 12/2009 Noguchi et al.
2010/0053137 A1* 3/2010 Park et al. ..................... 345/211
2010/0091030 A1* 4/2010 Park et al. ..................... 345/589
2012/0249613 A1 10/2012 Takada et al.

FOREIGN PATENT DOCUMENTS

| JP | 2009-192887 | 8/2009 |
| JP | 2009-244726 | 10/2009 |
| JP | 2010-33014 | 2/2010 |

* cited by examiner

BICUBIC INTERPOLATION

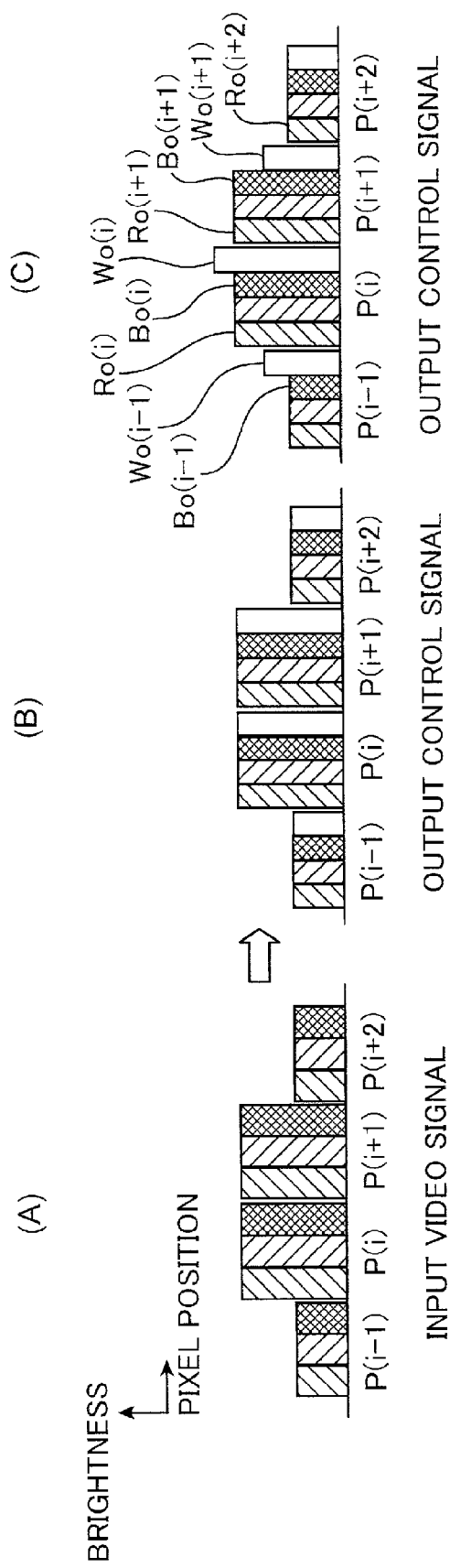

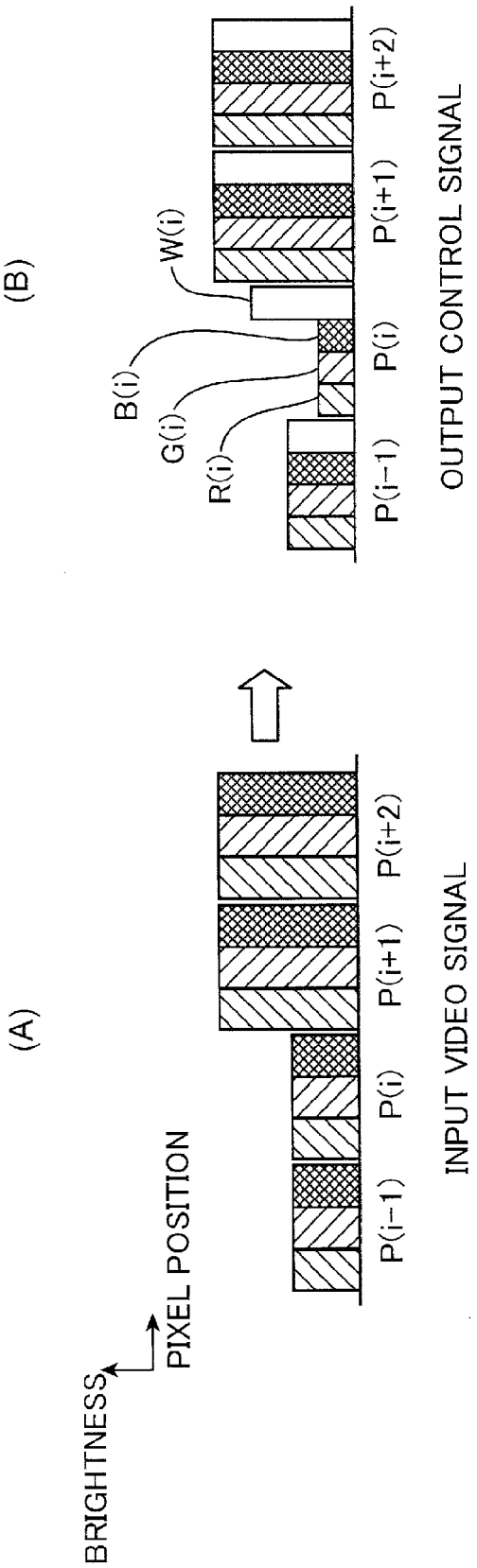

DISPLAY DEVICE HAVING A GENERATOR FOR GENERATING RGBW SIGNALS BASED ON UPPER AND LOWER LIMIT VALUE CALCULATOR AND DISPLAY METHOD THEREOF

TECHNICAL FIELD

The present invention relates to a display device having a display portion such as a liquid crystal display or a plasma display panel, and to a display method thereof.

BACKGROUND ART

As the foregoing display device, proposed is a display device which displays a color video picture configured from the three primary colors of red, green and blue with four colors on a display portion having pixels including red sub pixels, green sub pixels, blue sub pixels and white sub pixels (for example, refer to Patent Document 1). In the device described in Patent Document 1, a minimum value among the three-primary-color signals is generated as a white output control signal, and this white output control signal and three-primary-color output control signals obtained by subtracting the white output control signal from the foregoing three-primary-color input video signals are supplied to the display portion.

However, in the device described in Patent Document 1, since the white sub pixels are always used for a color that can be reproduced using the red sub pixels, the green sub pixels and the blue sub pixels or for a color that can be reproduced using the white sub pixels, the red sub pixels, the green sub pixels and the blue sub pixels become dark in comparison to the white sub pixels, and there were cases where black vertical streaks would become noticeable.

Patent Document 1: Japanese Patent Application Publication No. 2004-286814

SUMMARY OF THE INVENTION

The present invention resolves the foregoing problems, and an object of this invention is to provide a display device and a display method capable of displaying a video picture in which black vertical streaks are unnoticeable.

A display device according to the present invention includes: a display portion that includes pixels each having a red sub pixel, a green sub pixel, a blue sub pixel and a white sub pixel for respectively displaying a red color, a green color, a blue color and a white color, and displays a video picture corresponding to an input video signal; a ratio storage that stores, as a brightness ratio, a quotient obtained by dividing a brightness that can be displayed with the white sub pixel by a brightness that can be displayed with three-color sub pixels of the red sub pixel, the green sub pixel and the blue sub pixel; a converter that converts the video signal using the brightness ratio stored in the ratio storage to generate a red conversion signal, a green conversion signal and a blue conversion signal; an upper limit value calculator that calculates an upper limit value of a display brightness of the white sub pixel using the red conversion signal, the green conversion signal and the blue conversion signal generated by the converter and the brightness ratio stored in the ratio storage; a lower limit value calculator that calculates a lower limit value of the display brightness of the white sub pixel using the red conversion signal, the green conversion signal and the blue conversion signal generated by the converter and the brightness ratio stored in the ratio storage; and a white control signal generator that generates a white output control signal for controlling the display brightness of the white sub pixel such that the display brightness is not more than the upper limit value calculated by the upper limit value calculator and not less than the lower limit value calculated by the lower limit value calculator, and outputs the generated white output control signal to the display portion.

A display method according to the present invention is a display method for use in a display device having a display portion that includes pixels each having a red sub pixel, a green sub pixel, a blue sub pixel and a white sub pixel for respectively displaying a red color, a green color, a blue color and a white color, and displays a video picture corresponding to an input video signal, the method includes: a conversion step of converting the video signal using a brightness ratio, which is a quotient obtained by dividing a brightness that can be displayed with the white sub pixel by a brightness that can be displayed with three-color sub pixels of the red sub pixel, the green sub pixel and the blue sub pixel, to generate a red conversion signal, a green conversion signal and a blue conversion signal; an upper limit value calculation step of calculating an upper limit value of a display brightness of the white sub pixel using the red conversion signal, the green conversion signal and the blue conversion signal generated in the conversion step and the brightness ratio; a lower limit value calculation step of calculating a lower limit value of the display brightness of the white sub pixel using the red conversion signal, the green conversion signal and the blue conversion signal generated in the conversion step and the brightness ratio; and a white control signal generation step of generating a white output control signal for controlling the display brightness of the white sub pixel such that the display brightness is not more than the upper limit value calculated in the upper limit value calculation step and not less than the lower limit value calculated in the lower limit value calculation step, and outputting the generated white output control signal to the display portion.

BRIEF DESCRIPTION OF THE DRAWINGS

FIG. 13 is a diagram comparing the output control signals that are generated in the first embodiment and the third embodiment.

FIG. 14 is a diagram showing a comparative example in which the red output control signal, the green output control signal, and the blue output control signal are also generated in consideration of the influence of the peripheral pixels.

DESCRIPTION OF EMBODIMENTS

Embodiments of the present invention are now described with reference to the drawings.

(First Embodiment)

Figure 1:
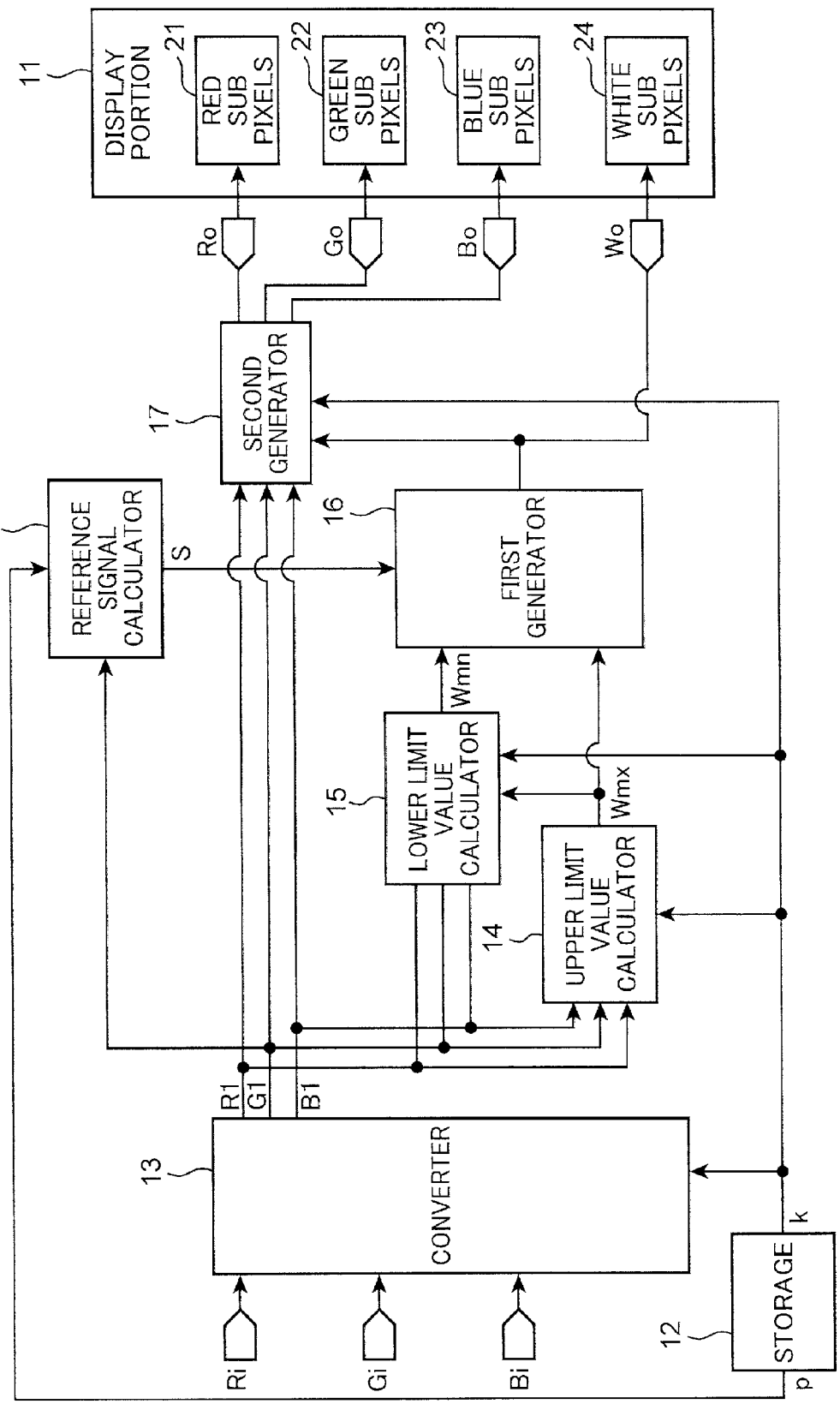
FIG. 1 is a block diagram showing the configuration of the display device according to the first embodiment of the present invention.

FIG. 1 is a block diagram showing the configuration of the display device according to the first embodiment of the present invention. This display device comprises, as shown in FIG. 1, a display portion 11, a storage 12, a converter 13, an upper limit value calculator 14, a lower limit value calculator 15, a first generator 16, a second generator 17 and a reference signal calculator 18.

The display portion 11 contains pixels arranged in a matrix. The respective pixels include red sub pixels 21 for displaying a red color, green sub pixels 22 for displaying a green color, blue sub pixels 23 for displaying a blue color, and white sub pixels 24 for displaying a white color. As the display portion 11, adopted may be various types of displays such as a liquid crystal display, a plasma display panel, and an organic EL (electro luminescence) display.

The storage 12 is configured, for example, from a hard disk or a flash memory, and stores a brightness ratio k and an adjustment factor p which are obtained in advance. The brightness ratio k is obtained as follows. Specifically, foremost, a brightness Wcd is measured by displaying all white sub pixels 24 of the display portion 11 at a maximum light quantity. Subsequently, a brightness (Rcd+Gcd+Bcd) is measured by displaying all red sub pixels 21, green sub pixels 22 and blue sub pixels 23 of the display portion 11 at a maximum light quantity, respectively. The brightness ratio k is a quotient obtained by dividing the former by the latter. In other words, the brightness ratio k is obtained based on the following:

$$k = Wcd/(Rcd+Gcd+Bcd) \quad (1).$$

The brightness ratio k obtained in advance as described above is stored in the storage 12.

Moreover, the adjustment factor p represents the ratio of the red sub pixels 21, the green sub pixels 22 and the blue sub pixels 23, and the white sub pixels 24, used in displaying a video picture in the display portion 11. More specifically, the adjustment factor p adjusts the ratio of the signal level representing the display brightness of the white sub pixels 24 relative to the signal level of a green conversion signal G1 generated by the converter 13. The adjustment factor p is set in advance and is stored in the storage 12. The adjustment factor p is set to be 0<p<1 and, in this embodiment, is set to be p=0.5 for instance.

The converter 13 converts the input video signals Ri, Gi, Bi based on the brightness ratio k, to generate red, green and blue conversion signals R1, G1, B1 for use in the display control of the red sub pixels 21, the green sub pixels 22 and the blue sub pixels 23. The upper limit value calculator 14 calculates an upper limit value Wmx of the display brightness of the white sub pixels 24 using the red, green and blue conversion signals R1, G1, B1 and the brightness ratio k. The lower limit value calculator 15 calculates a lower limit value Wmn of the display brightness of the white sub pixels 24 using the upper limit value Wmx of the display brightness of the white sub pixels 24, the red, green and blue conversion signals R1, G1, B1 and the brightness ratio k.

The reference signal calculator 18 calculates a reference signal S for use in the display control of the white sub pixels 24 using the green conversion signal G1 and the adjustment factor p. The first generator 16 generates a white output control signal Wo for controlling the display brightness of the white sub pixels 24 using the upper limit value Wmx, the lower limit value Wmn and the reference signal S, and outputs the generated white output control signal Wo to the second generator 17 and the display portion 11. The second generator 17 generates red, green and blue output control signals Ro, Go, Bo for controlling the display brightness of the red sub pixels 21, the green sub pixels 22 and the blue sub pixels 23 using the red, green and blue conversion signals R1, G1, B1, the brightness ratio k and the white output control signal Wo, and outputs the generated red, green and blue output control signals Ro, Go, Bo to the display portion 11. In this embodiment, the green conversion signal G1 corresponds to the reference conversion signal, the first generator 16 corresponds to the white control signal generator, and the second generator 17 corresponds to the color control signal generator. Here, the converter 13, the upper limit value calculator 14, the lower limit value calculator 15, the first generator 16, the second generator 17 and the reference signal calculator 18 are now described in further detail with reference to FIGS. 2 to 4.

Figure 2:
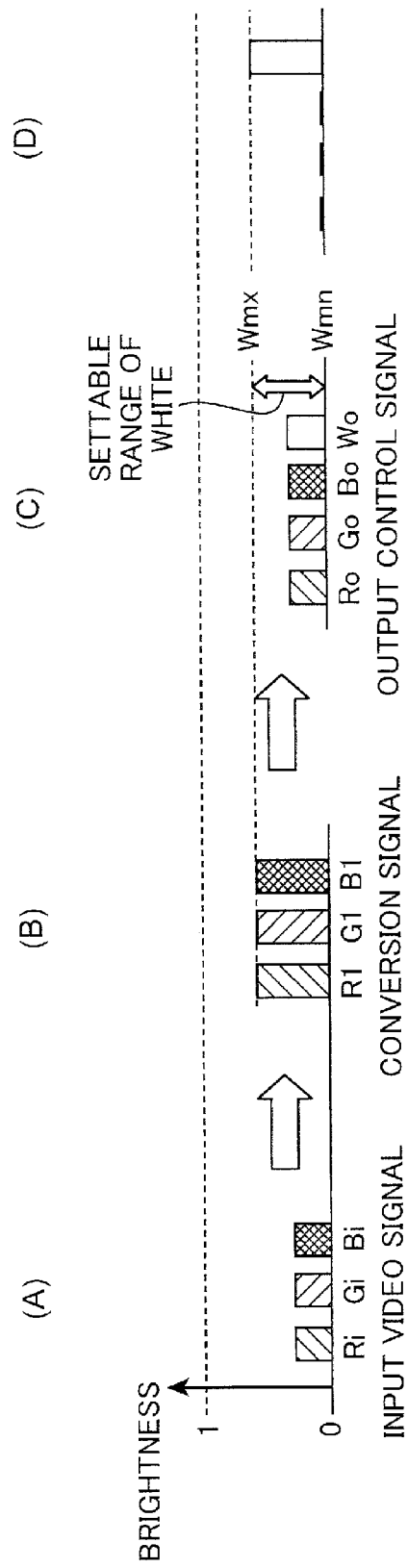
FIG. 2 is a diagram schematically showing the respective signals such as the input video signal.
Figure 3:
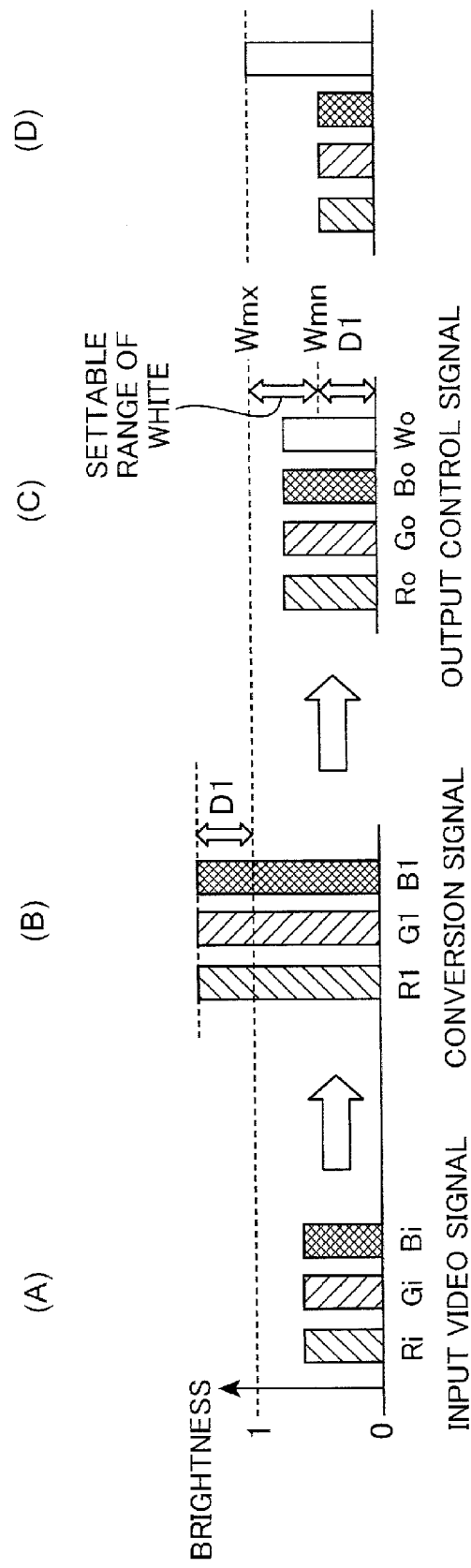
FIG. 3 is a diagram schematically showing the respective signals such as the input video signal.
Figure 4:
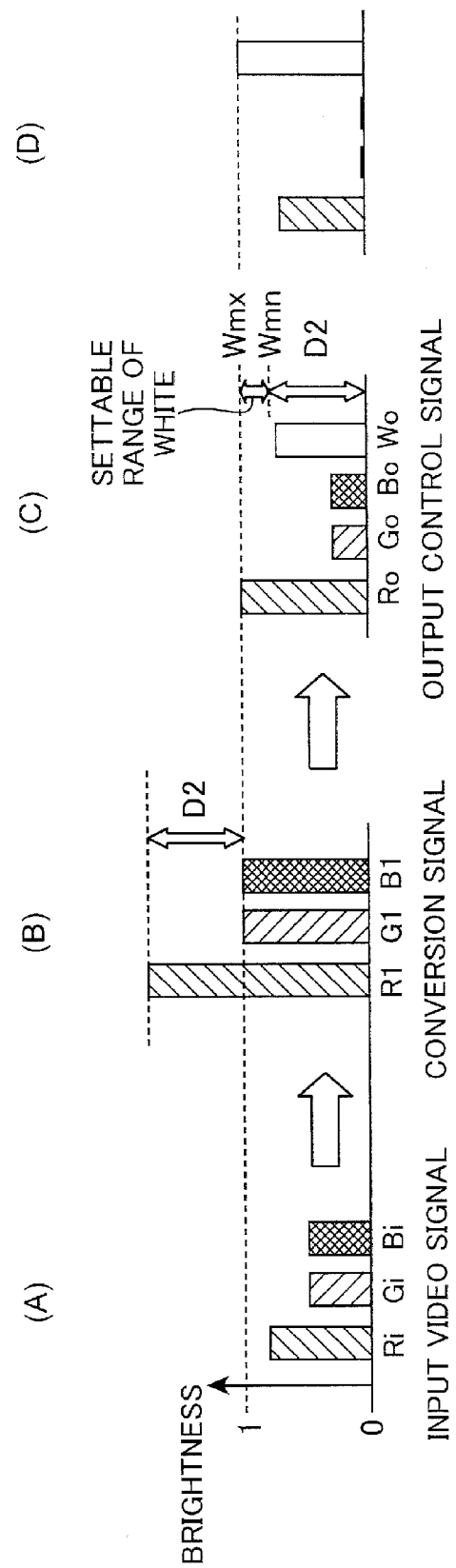
FIG. 4 is a diagram schematically showing the respective signals such as the input video signal.

FIGS. 2 to 4 are diagrams schematically showing the respective signals such as the input video signal. Sections (A) of FIGS. 2 to 4 respectively show examples of the input video signals Ri, Gi, Bi. Sections (B) of FIGS. 2 to 4 respectively show examples of the conversion signals R1, G1, B1. Sections (C) of FIGS. 2 to 4 respectively show examples of the output control signals Ro, Go, Bo, Wo. Sections (D) of FIGS. 2 to 4 respectively show the output control signals in the comparative examples. Note that, in FIGS. 2 to 4, k=1 and p=0.5 are illustrated for the sake of convenience of description.

The converter 13 generates the red conversion signal R1, the green conversion signal G1, and the blue conversion signal B1 based on Formula (2) from the input video signals Ri, Gi, Bi.

$$R1 = (1+k) \times Ri,$$
$$G1 = (1+k) \times Gi,$$
$$B1 = (1+k) \times Bi \quad (2)$$

In other words, the converter 13 generates the red conversion signal R1, the green conversion signal G1, and the blue conversion signal B1 by respectively increasing the input video signals Ri, Gi, Bi in an amount that is equivalent to the brightness ratio k. The converter 13 generates the conversion signals R1, G1, B1 shown in section (B) of FIG. 2, for example, from the input video signals Ri, Gi, Bi shown in section (A) of FIG. 2.

In FIGS. 2 to 4, "1" shows the maximum value of the displayable brightness; that is, the maximum value of the range of gradation that can be displayed by the red sub pixels 21, the green sub pixels 22 and the blue sub pixels 23, and, when the signals are represented in 8 bits, the maximum value corresponds to "255". In other words, in this embodiment, the signals of the respective colors are shown by normalizing the maximum value of the displayable brightness to "1". The conversion signals R1, G1, B1 shown in sections (B) of FIGS. 2 to 4 represent the increase in the brightness level that has become displayable based on the red sub pixels 21, the green sub pixels 22 and the blue sub pixels 23 by obtaining a brightness increasing effect based on the white sub pixels 24.

The upper limit value calculator 14 calculates the upper limit value Wmx of the display brightness of the white sub pixels 24 based on Formula (3) from the conversion signals R1, G1, B1.

$$Wmx=\min(R1/k, G1/k, B1/k, 1) \quad (3)$$

In other words, when any one among R1/k, G1/k, B1/k obtained by respectively dividing the conversion signals R1, G1, B1 by k is not exceeding the brightness maximum value, the upper limit value calculator 14 uses the minimum non-exceeding R1/k, G1/k, B1/k as the upper limit value Wmx. Meanwhile, when all of R1/k, G1/k, B1/k are exceeding the brightness maximum value, the upper limit value calculator 14 uses the brightness maximum value; that is, uses "1" as the upper limit value Wmx.

The lower limit value calculator 15 calculates the lower limit value Wmn of the display brightness of the white sub pixels 24 based on Formula (4) from the conversion signals R1, G1, B1.

$$Wmn=\min\{Wmx, \max(R1/k-1, G1/k-1, B1/k-1, 0)\} \quad (4)$$

Note that relation of Wmn>Wmx will never be obtained based on Formula (4).

The lower limit value calculator 15 foremost obtains R1/k−1, G1/k−1, B1/k−1 by respectively dividing the conversion signals R1, G1, B1 by k and subtracting 1 therefrom. The R1/k−1, G1/k−1, B1/k−1 respectively represent the excess portion of the R1/k, G1/k, B1/k, which are obtained by respectively dividing the conversion signals R1, G1, B1 by k, relative to the brightness maximum value. Subsequently, the lower limit value calculator 15 obtains the max(R1/k−1, G1/k−1, B1/k−1, 0), and thereafter calculates the lower limit value Wmn based on Formula (4).

Here, examples of the upper limit value Wmx and the lower limit value Wmn are described. For example, in section (B) of FIG. 2, since R1/k=G1/k=B1/k<1, the upper limit value Wmx will be:

$$Wmx=R1/k=G1/k=B1/k$$

as shown in section (C) of FIG. 2 based on Formula (3). Meanwhile, in section (B) of FIG. 2, since R1/k<1, G1/k<1, B1/k<1, the lower limit value Wmn will be:

Wmn=0 as shown in section (C) of FIG. 2 based on Formula (4).

For example, in section (B) of FIG. 3, since R1/k=G1/k=B1/k>1, the upper limit value Wmx will be:

Wmx=1 as shown in section (C) of FIG. 3 based on Formula (3). Meanwhile, since R1/k=G1/k=B1/k>1, the lower limit value Wmn becomes a value that is equivalent to the excess portion D1 relative to the brightness maximum value of the R1/k, G1/k, B1/k as shown in section (C) of FIG. 3 based on Formula (4).

For example, in section (B) of FIG. 4, since R1/k>1, G1/k=B1/k=1, the upper limit value Wmx will be:

Wmx=1 as shown in section (C) of FIG. 4 based on Formula (3). Meanwhile, since R1/k>1, the lower limit value Wmn becomes a value that is equivalent to the excess portion D2 relative to the brightness maximum value of the R1/k as shown in section (C) of FIG. 4 based on Formula (4).

As described above, as a result of using the excess portion of the R1/k, G1/k, B1/k, which are obtained by respectively dividing the conversion signals R1, G1, B1 by the brightness ratio k, relative to the brightness maximum value as the lower limit value Wmn of the display brightness of the white sub pixels 24, the portion that cannot be represented as the display brightness due to the brightness maximum value being exceeded can be reliably compensated with the display brightness of the white sub pixels 24.

The reference signal calculator 18 calculates the reference signal S based on Formula (5).

$$S=p\times G1 \quad (5)$$

The first generator 16 uses the upper limit value Wmx as the white output control signal Wo when the reference signal S exceeds the upper limit value Wmx, uses the lower limit value Wmn as the white output control signal Wo when the reference signal S is less than the lower limit value Wmn, and uses the reference signal S as the white output control signal Wo when the reference signal S is not more than the upper limit value Wmx and not less than the lower limit value Wmn. In other words, the first generator 16:

sets Wo=Wmx when S>Wmx,
sets Wo=Wmn when S<Wmn, and
sets Wo=S when Wmn≤S≤Wmx.

The second generator 17 generates the red, green and blue output control signals Ro, Go, Bo based on Formula (6).

$$Ro=R1-k\times Wo,$$

$$Go=G1-k\times Wo,$$

$$Bo=B1-k\times Wo \quad (6)$$

In Formula (6), when k<1, in comparison to a case of directly subtracting the white output control signal Wo, it is possible to inhibit the red, green and blue output control signals Ro, Go, Bo from becoming too dark.

Examples of the red, green, blue and white output control signals Ro, Go, Bo, Wo generated as described above are respectively shown in sections (C) of FIGS. 2 to 4. Meanwhile, sections (D) of FIGS. 2 to 4 show, as the comparative examples, the red, green and blue output control signals obtained by generating a minimum value among the red, green and blue conversion signals as the white output control signal, and subtracting the white output control signal from the red, green and blue conversion signals.

For example, when R1=G1=B1<1, k=1, and p=0.5 as shown in section (B) of FIG. 2, Wo=S=p×G1=G/1;2, and Wo=Ro=Go=Bo as shown in section (C) of FIG. 2. Meanwhile, in the comparative examples, as shown in section (D) of FIG. 2, the minimum value among the red, green and blue conversion signals is generated as the white output control signal. Moreover, since the red, green and blue output control signals are generated by subtracting the white output control signal from the red, green and blue conversion signals, the red, green and blue output control signals become zero. Even in the case shown in section (D) of FIG. 2, the brightness is the same since k=1, and the colors are also reproduced. Nevertheless, with the output control signal shown in section (D) of FIG. 2, there are cases where vertical streaks become noticeable in the video picture displayed on the display portion 11.

For example, when R1=G1=B1>1, k=1, and p=0.5 as shown in section (B) of FIG. 3, Wo=S=p×G1=G/1;2, and Wo=Ro=Go=Bo as shown in section (C) of FIG. 3. Meanwhile, in the comparative examples, as shown in section (D)

of FIG. 3, the minimum value among the red, green and blue conversion signals is generated as the white output control signal. Moreover, the red, green and blue output control signals are generated by subtracting the white output control signal from the red, green and blue conversion signals. Accordingly, the red, green and blue output control signals shown in section (D) are of a smaller value than the red, green and blue output control signals shown in section (C). Accordingly, the ratio of the red, green and blue output control signals Ro, Go, Bo and the white output control signal Wo shown in section (C) of FIG. 3 is a more appropriate value in comparison to the case shown in section (D).

In addition, for instance, when R1>1, G1=B1=1, k=1, and p=0.5 as shown in section (B) of FIG. 4, S=p×G1<Wmn. Accordingly, Wo=Wmn, Ro=R1−Wo=1, and Go=Bo>0 as shown in section (C) of FIG. 4. In other words, the green and blue output control signals Go, Bo will not become zero. Meanwhile, in the comparative examples, as shown in section (D) of FIG. 4, the white output control signal is generated as 1, and the green and blue output control signals become zero. Accordingly, the ratio of the red, green and blue output control signals Ro, Go, Bo and the white output control signal Wo shown in section (C) of FIG. 4 is also a more appropriate value in comparison to the case shown in section (D).

As described above, in this embodiment, as shown in sections (C) of FIGS. 2 to 4, the ratio of the red, green and blue output control signals Ro, Go, Bo and the white output control signal Wo is an appropriate value. Meanwhile, in the comparative examples shown in sections (D), the ratios of the red, green and blue output control signals relative to the white output control signal are small. Consequently, in the comparative examples shown in sections (D), there are cases where vertical streaks become noticeable in the video picture displayed on the display portion 11.

Figure 5:
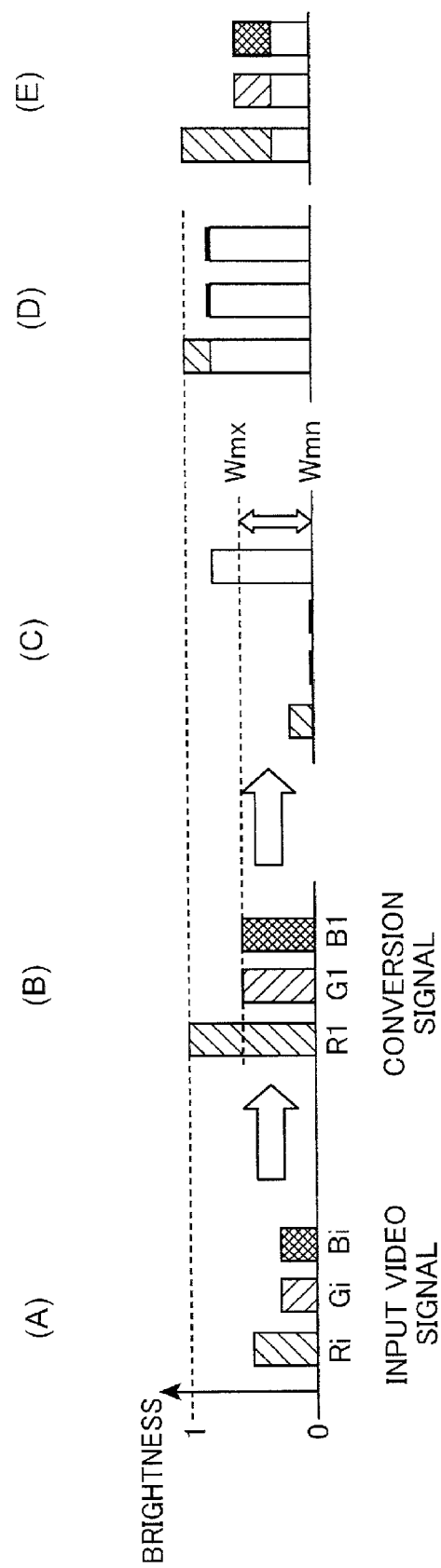
FIG. 5 is a diagram describing the effect of setting the maximum value of the display brightness of the white sub pixels.
Figure 6:
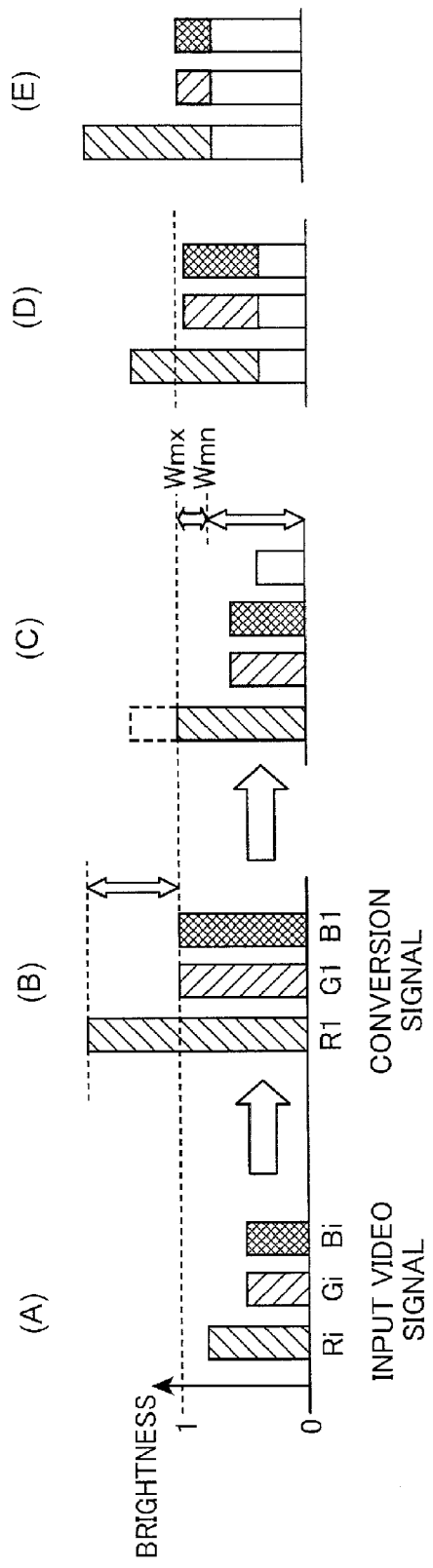
FIG. 6 is a diagram describing the effect of setting the minimum value of the display brightness of the white sub pixels.

FIG. 5 is a diagram describing the effect of setting the upper limit value Wmx of the display brightness of the white sub pixels 24. FIG. 6 is a diagram describing the effect of setting the lower limit value Wmn of the display brightness of the white sub pixels 24. The effect of providing the upper limit value Wmx and the lower limit value Wmn are now described with reference to FIGS. 5 and 6.

For example, the conversion signals R1, G1, B1 shown in section (B) of FIG. 5 are obtained from the input video signals Ri, Gi, Bi shown in section (A) of FIG. 5. In addition, let it be assumed that a white output control signal greater than the upper limit value Wmx has been generated from the conversion signals R1, G1, B1 as shown in section (C) of FIG. 5. In this case, as shown in section (D) of FIG. 5, the color becomes light since the ratios of the colors of red, green, blue become small. Thus, as shown in section (E) of FIG. 5, preferably, the green and blue output control signals are not made to be zero, and the ratios of the colors of red, green, blue are not made to be too small.

Moreover, for example, the conversion signals R1, G1, B1 shown in section (B) of FIG. 6 are obtained from the input video signals Ri, Gi, Bi shown in section (A) of FIG. 6. In addition, let it be assumed that a white output control signal that is smaller than the lower limit value Wmn is generated as shown in section (C) of FIG. 6 from the conversion signals R1, G1, B1. In this case, as shown in section (D) of FIG. 6, the ratios of the colors of red, green, blue become small and the brightness becomes insufficient. Thus, the color becomes light and becomes a dark color. Therefore, as shown in section (E) of FIG. 6, preferably, the white output control signal is increased to an appropriate level to ensure the display brightness.

As described above, according to the first embodiment, the reference signal S is generated using the adjustment factor p representing the ratio of the red, green and blue output control signals Ro, Go, Bo and the white output control signal Wo for use in display, and the white output control signal Wo is generated using this reference signal S. Accordingly, the ratio of the red, green and blue output control signals Ro, Go, Bo and the white output control signal Wo for use in display can be set appropriately. As a result, it is possible to prevent the brightness of the red, green and blue sub pixels 21 to 23 from becoming too small relative to the brightness of the white sub pixels 24, and to prevent vertical streaks from becoming noticeable in the video picture displayed on the display portion 11.

Moreover, according to the first embodiment, the upper limit value Wmx and the lower limit value Wmn of the display brightness of the white sub pixels 24 are calculated by the upper limit value calculator 14 and the lower limit value calculator 15, and the white output control signal Wo is generated such that it is not more than the upper limit value Wmx and not less than the lower limit value Wmn of the display brightness of the white sub pixels 24. Accordingly, it is possible to prevent the color from becoming light or becoming dark. Consequently, it is possible to display, on the display portion 11, a high quality video picture which faithfully reproduces the colors of the input video signals.

(Second Embodiment)

Figure 7:
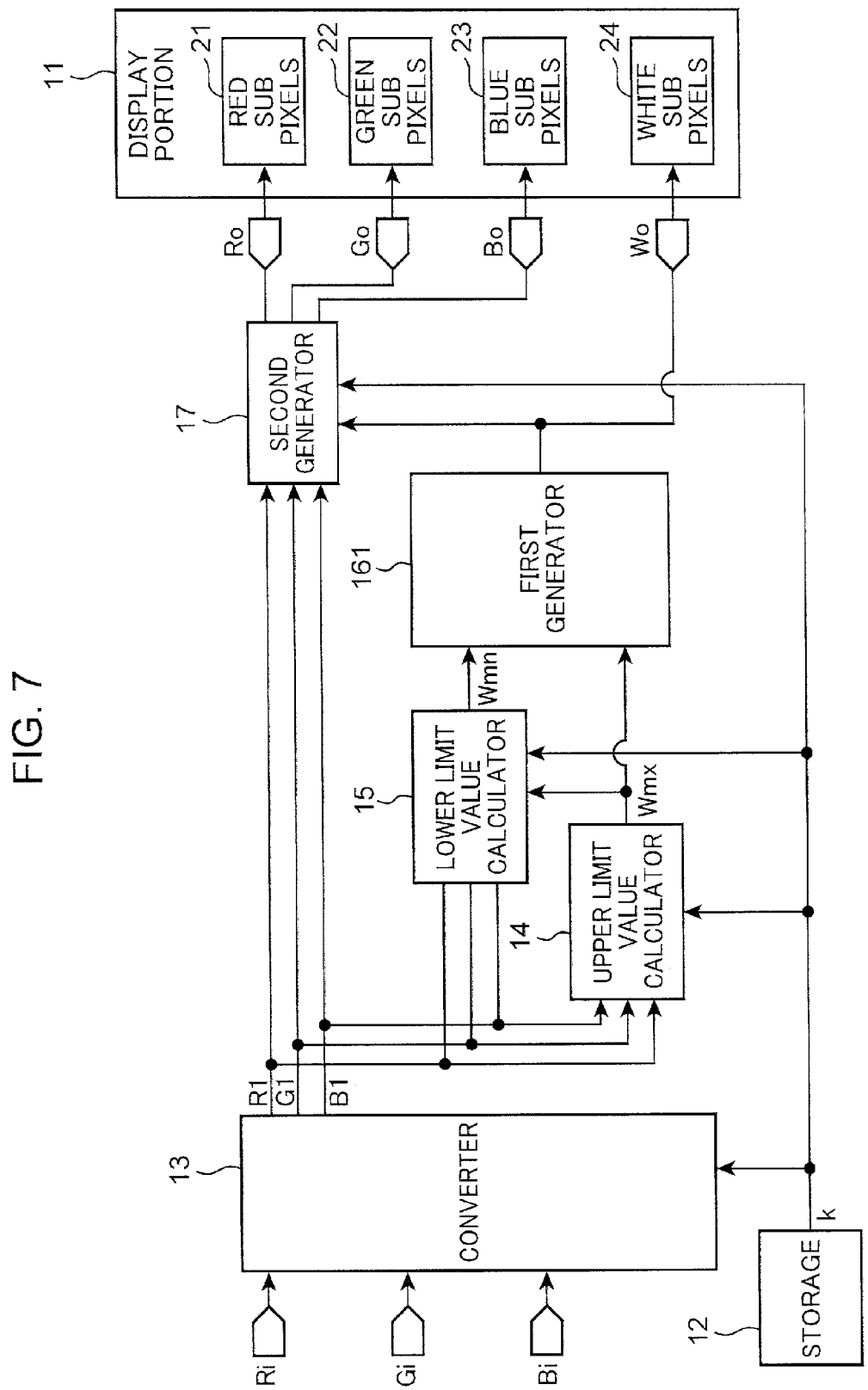
FIG. 7 is a block diagram showing the configuration of the display device according to the second embodiment of the present invention.

FIG. 7 is a block diagram showing the configuration of the display device according to the second embodiment of the present invention. In the second embodiment, the same symbol is assigned to the same element as the first embodiment. The display device according to the second embodiment shown in FIG. 7 does not comprise the reference signal calculator 18 and comprises a first generator 161 as substitute for the first generator 16, in the display device according to the first embodiment shown in FIG. 1. The second embodiment is now described mainly regarding the differences with the first embodiment.

The first generator 161 retains a factor A that is set in advance, generates the white output control signal Wo based on Formula (7) using the factor A, and outputs the generated white output control signal Wo to the second generator 17 and the display portion 11.

$$Wo = A \times Wmx + (1-A) \times Wmn \quad (7)$$

The factor A is set to be 0<A<1 and, for instance, is set to be A=0.5. In this embodiment, the first generator 161 corresponds to the white control signal generator, and the second generator 17 corresponds to the color control signal generator.

In the second embodiment also, the upper limit value Wmx and the lower limit value Wmn of the display brightness of the white sub pixels 24 are calculated by the upper limit value calculator 14 and the lower limit value calculator 15, and the white output control signal Wo is generated such that it is not more than the upper limit value Wmx and not less than the lower limit value Wmn of the display brightness of the white sub pixels 24. Accordingly, as with the foregoing first embodiment, it is possible to prevent the color from becoming light or becoming dark. Consequently, it is possible to display, on the display portion 11, a high quality video picture which faithfully reproduces the colors of the input video signals.

(Third Embodiment)

Figure 8:
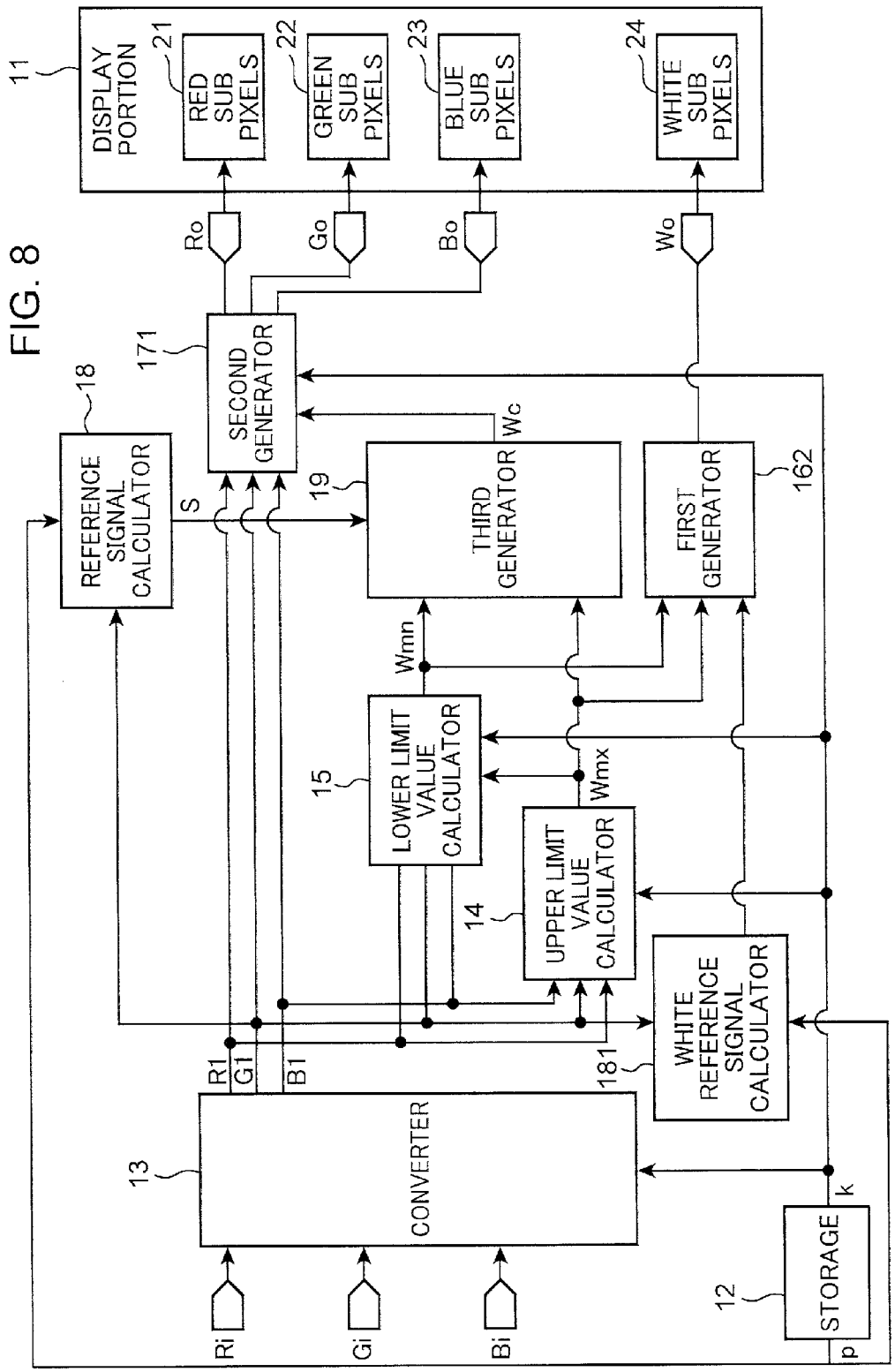
FIG. 8 is a block diagram showing the configuration of the display device according to the third embodiment of the present invention.

FIG. 8 is a block diagram showing the configuration of the display device according to the third embodiment of the present invention. In the third embodiment, the same symbol is assigned to the same element as the first embodiment. The display device according to the third embodiment shown in FIG. 8 comprises a first generator 162 as substitute for the first generator 16, comprises a second generator 171 as substitute for the second generator 17, and additionally comprises a white reference signal calculator 181 and a third generator 19, in the display device according to the first embodiment shown in FIG. 1. The third embodiment is now described mainly regarding the differences with the first embodiment.

The white reference signal calculator 181 calculates, when a control target of the output control signal is defined as a present pixel, a white reference signal Sw(i) for use in the display control of the white sub pixels 24 included in the present pixel using the green conversion signal G1 corresponding to the present pixel, the green conversion signal G1 corresponding to at least one (for instance, three in this embodiment) peripheral pixel positioned around the present pixel, and the adjustment factor p. The white reference signal calculator 181 is now described in further detail with reference to FIG. 9.

Figure 9:
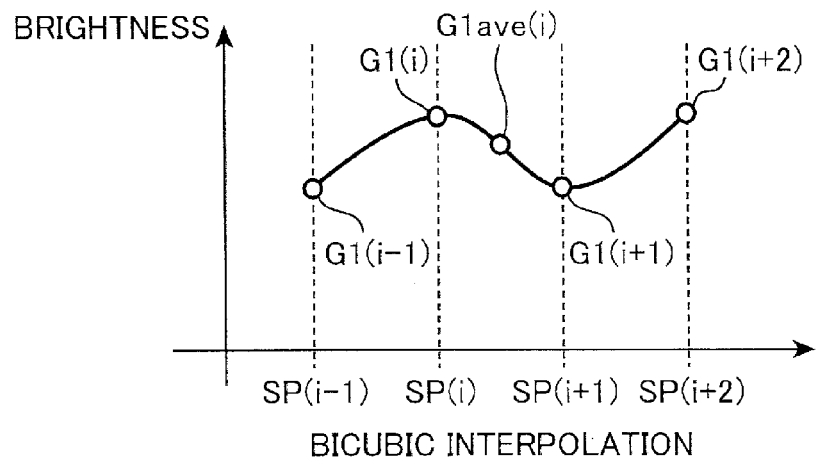
FIG. 9 is a diagram describing the interpolation using the conversion signals of the present pixels and the peripheral pixels.

FIG. 9 is a diagram describing the interpolation using the conversion signals of the present pixel and the peripheral pixels. The white reference signal calculator 181 performs bicubic interpolation based on Formula (8) to generate the interpolation value G1ave(i).

$$G1ave(i)=a \times G1(i-1)+b \times G1(i)+c \times G1(i+1)+d \times G1(i+2) \quad (8)$$

The white reference signal calculator 181 generates the white reference signal Sw(i) based on Formula (9) using the interpolation value G1ave(i).

$$Sw(i)=p \times G1ave(i) \quad (9)$$

Here, G1(i) is the green conversion signal of the present pixel SP(i), G1(i−1) is the green conversion signal of the pixel SP(i−1) adjacent to the present pixel SP(i), G1(i+1) is the green conversion signal of the pixel SP(i+1) adjacent to the present pixel SP(i) on a side that is opposite to the pixel SP(i−1), and G1(i+2) is the green conversion signal of the pixel SP(i+2) adjacent to the pixel SP(i+1). Moreover, a, b, c, d are predetermined factors and are set, for example, as a+b+c+d=1. Note that the factors a, b, c, d are set, for example, as a=d, b=c when the widths of the red sub pixels 21, the green sub pixels 22, the blue sub pixels 23, and the white sub pixels 24 are equal in the display portion 11.

Returning to FIG. 8, the first generator 162 generates the white output control signal Wo for controlling the display brightness of the white sub pixels 24 using the upper limit value Wmx, the lower limit value Wmn and the white reference signal Sw(i), and outputs the generated white output control signal Wo to the display portion 11. The first generator 162 generates the white output control signal Wo in the same manner as the first generator 16 of the first embodiment other than using the white reference signal Sw(i). In other words, the first generator 162:

sets Wo=Wmx when Sw(i)>Wmx,
sets Wo=Wmn when Sw(i)<Wmn, and
sets Wo=Sw(i) when Wmn≤Sw(i)≤Wmx.

The third generator 19 generates the white correction signal Wc for controlling the red sub pixels 21, the green sub pixels 22 and the blue sub pixels 23 using the upper limit value Wmx, the lower limit value Wmn and the reference signal S, and outputs the generated white correction signal Wc to the second generator 171. The third generator 19 generates the white correction signal Wc in the same manner as the first generator 16 of the first embodiment generates the white output control signal Wo. In other words, the third generator 19:

sets Wc=Wmx when S>Wmx,
sets Wc=Wmn when S<Wmn, and
sets Wc=S when Wmn≤S≤Wmx.

The second generator 171 generates the red, green and blue output control signals Ro, Go, Bo for controlling the display brightness of the red sub pixels 21, the green sub pixels 22 and the blue sub pixels 23 using the red, green and blue conversion signals R1, G1, B1, the brightness ratio k, and the white correction signal Wc, and outputs the generated red, green and blue output control signals Ro, Go, Bo to the display portion 11. The second generator 171 generates the red, green and blue output control signals Ro, Go, Bo in the same manner as the second generator 17 of the first embodiment other than using the white correction signal Wc. In other words, the second generator 171 generates the red, green and blue output control signals Ro, Go, Bo based on Formula (10).

$$Ro=R1-k \times Wc,$$

$$Go=G1-k \times Wc,$$

$$Bo=B1-k \times Wc \quad (10)$$

In this embodiment, the green conversion signal G1 corresponds to the reference conversion signal, the reference signal calculator 18 corresponds to the color reference signal calculator, the first generator 162 corresponds to the white control signal generator, the second generator 171 corresponds to the color control signal generator, and the third generator 19 corresponds to the white correction signal generator.

Figure 10:
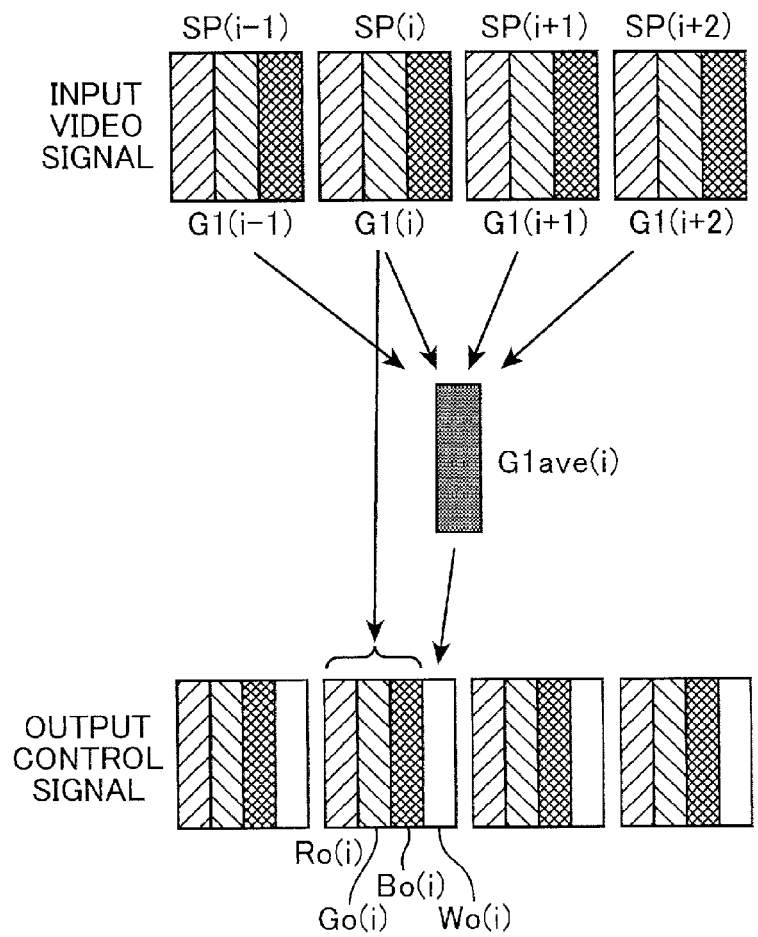
FIG. 10 is a diagram describing the generation of an output control signal in the third embodiment.

FIG. 10 is a diagram describing the generation of an output control signal in the third embodiment. As shown in FIG. 10, the video signals of the adjacent pixels SP(i−1), SP(i), SP(i+1), SP(i+2) are used among the input video signals. Let it be assumed that the present pixel which is a calculation target is the pixel SP(i). The generation of the output control signal in the third embodiment is now described with reference to FIGS. 8 and 10.

The white reference signal calculator 181 calculates the interpolation value G1ave(i) using the green conversion signals G1(i−1), G1(i), G1(i+1), G1(i+2) generated by the converter 13 from the input video signal, and multiplies the interpolation value G1ave(i) by the adjustment factor p to calculate the white reference signal Sw(i). The first generator 162 generates the white output control signal Wo(i) of the present pixel using the white reference signal Sw(i). Meanwhile, the second generator 171 generates the red, green and blue output control signals Ro(i), Go(i), Bo(i) of the present pixel using the reference signal S and the white correction signal Wc that were calculated by using only the green conversion signal G1(i) of the present pixel SP(i) as with the first embodiment.

In the third embodiment, the white reference signal calculator 181 performs bicubic interpolation to generate the interpolation value G1ave(i), but the present invention is not limited thereto. For example, as shown in FIG. 11, one peripheral pixel may be used to generate the interpolation value G1ave(i).

Figure 11:
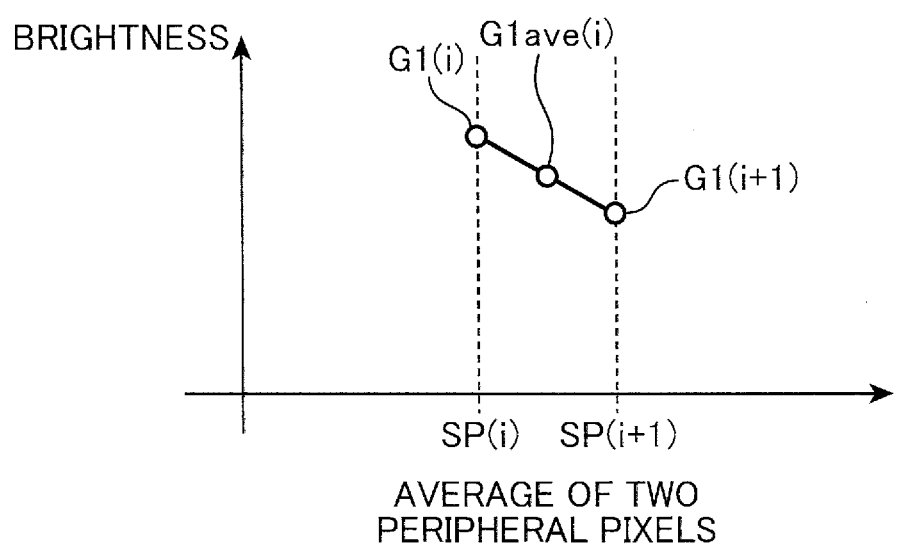
FIG. 11 is a diagram describing another example of the interpolation using the conversion signals of the present pixels and the peripheral pixels.

FIG. 11 is a diagram describing another example of the interpolation using the conversion signals of the present pixel and the peripheral pixel. In FIG. 11, the white reference signal calculator 181 generates the interpolation value G1ave(i) based on Formula (11).

$$G1ave(i)=\{G1(i)+G1(i+1)\}/2 \quad (11)$$

In other words, in FIG. 11, the white reference signal calculator 181 calculates, as the interpolation value G1ave(i), the average value of the conversion signal G1(i) of the present pixel SP(i) and the green conversion signal G1(i+1) of the peripheral pixel SP(i+1) adjacent to the present pixel SP(i). With the interpolation shown in FIG. 11 also, the white reference signal calculator 181 can favorably calculate the white reference signal Sw(i) of the present pixel.

Figure 12:
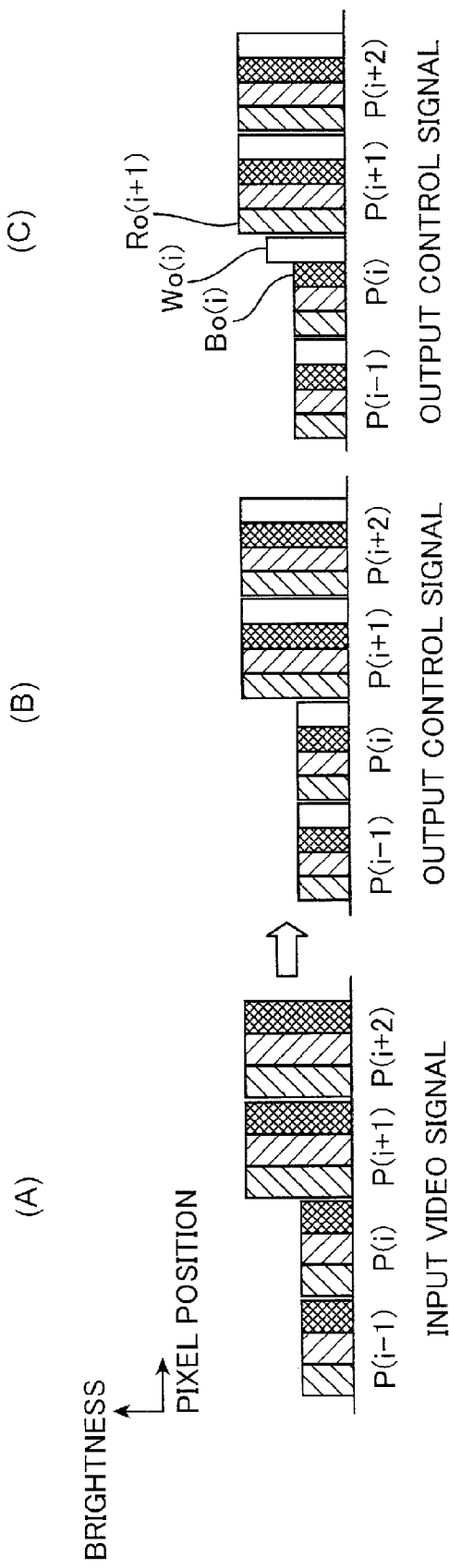
FIG. 12 is a diagram comparing the output control signals that are generated in the first embodiment and the third embodiment.

FIGS. 12 and 13 are diagrams comparing the output control signals that are generated in the first embodiment and the third embodiment. Section (A) of FIG. 12 shows an example of the input video signals. Section (B) of FIG. 12 shows the output controls signals generated in the first embodiment relative to the input video signals of section (A) of FIG. 12. Section (C) of FIG. 12 shows the output control signals generated in the third embodiment relative to the input video signals of section (A) of FIG. 12. Section (A) of FIG. 13 shows another example of the input video signals. Section (B) of FIG. 13 shows the output control signals generated in the first embodiment relative to the input video signals of section (A) of FIG. 13. Section (C) of FIG. 13 shows the output control signals generated in the third embodiment relative to the input video signals of section (A) of FIG. 13.

In the example shown in FIG. 12, as shown in section (A), the colors of red, green, blue are of gray input video signals having the same brightness. However, the magnitude relationship of the brightnesses P(i−1), P(i), P(i+1), P(i+2) of the respective pixels is P(i−1)=P(i)<P(i+1)=P(i+2). Relative to these input video signals, in the first embodiment, as shown in section (B), a white output control signal having the same brightness as the red, green and blue output control signals is generated. This is the same as the example shown in sections (C) of FIGS. 2 and 3.

Meanwhile, in the third embodiment, as a result of performing bicubic interpolation using the brightness of the peripheral pixels, the white output control signal Wo is generated in consideration of the influence of the peripheral pixels. Consequently, as shown in section (C), the brightness Wo(i) of the white output control signal of the pixel P(i) is:

$$Bo(i)<Wo(i)<Ro(i+1)$$

relative to the brightness Bo(i) of the blue output control signal of the pixel P(i) and the brightness Ro(i+1) of the red output control signal of the pixel P(i+1). Accordingly, in comparison to the first embodiment shown in section (B), it is possible to display an even smoother video picture on the display portion 11.

In the example shown in FIG. 13, as with FIG. 12, the colors of red, green, blue are of gray input video signals having the same brightness. However, as shown in section (A) of FIG. 13, the magnitude relationship of the brightnesses P(i−1), P(i), P(i+1), P(i+2) of the respective pixels is P(i−1)<P(i)=P(i+1)>P(i+2). Relative to these input video signals, in the first embodiment, as shown in section (B), a white output control signal having the same brightness as the red, green and blue output control signals is generated. This is the same as the example shown in sections (C) of FIGS. 2 and 3.

Meanwhile, in the third embodiment, as a result of performing bicubic interpolation using the brightness of the peripheral pixels, the white output control signal Wo is generated in consideration of the influence of the peripheral pixels. Consequently, as shown in section (C), the brightness Wo(i−1) of the white output control signal of the pixel P(i−1) is:

$$Bo(i-1)<Wo(i-1)<Ro(i)$$

relative to the brightness Bo(i−1) of the blue output control signal of the pixel P(i−1) and the brightness Ro(i) of the red output control signal of the pixel P(i). Moreover, the brightness Wo(i) of the white output control signal of the pixel P(i) is:

$$Bo(i)<Wo(i)>Ro(i+1)$$

relative to the brightness Bo(i) of the blue output control signal of the pixel P(i) and the brightness Ro(i+1) of the red output control signal of the pixel P(i+1). Moreover, the brightness Wo(i+1) of the white output control signal of the pixel P(i+1) is:

$$Bo(i+1)<Wo(i+1)<Ro(i+2)$$

relative to the brightness Bo(i+1) of the blue output control signal of the pixel P(i+1) and the brightness Ro(i+2) of the red output control signal of the pixel P(i+2). Accordingly, in comparison to the first embodiment shown in section (B), it is possible to display an even smoother video picture on the display portion 11.

FIG. 14 is a diagram showing, unlike the third embodiment, a comparative example in which the red output control signal, the green output control signal, and the blue output control signal are also generated in consideration of the influence of the peripheral pixels. Section (A) of FIG. 14 shows an example of the input video signals. Section (B) of FIG. 14 shows the output control signals of the comparative example that are generated relative to the input video signals of section (A) of FIG. 14. As described above, in the third embodiment, only the white output control signal is generated in consideration of the influence of the peripheral pixels, and the red, green and blue output control signals are generated only from the signals of the present pixel without consideration of the peripheral pixels as in the first embodiment. Meanwhile, the comparative example in which the red, green and blue output control signals are also generated in consideration of the influence of the peripheral pixels is now described with reference to FIG. 14.

As shown in section (A) of FIG. 14, the colors of red, green, blue are of gray input video signals having the same brightness. However, the magnitude relationship of the brightnesses P(i−1), P(i), P(i+1), P(i+2) of the respective pixels is P(i−1)=P(i)<P(i+1)=P(i+2). Since the white output control signal is generated in consideration of the influence of the peripheral pixels relative to these input video signals, as shown in section (B) of FIG. 14, the brightness W(i) of the white output control signal of the pixel P(i) is an intermediate value of the brightnesses P(i−1), P(i+1) of the adjacent pixels as with the case shown in section (C) of FIG. 12.

Meanwhile, in FIG. 14, the red, green and blue output control signals are also generated in consideration of the influence of the peripheral pixels. Accordingly, as shown in section (B) of FIG. 14, the brightnesses R(i), G(i), B(i) of the red, green and blue output control signals of the pixel P(i) are lower than the brightnesses P(i−1), P(i+1) of the adjacent pixels. Thus, a discontinuous unevenness will occur in the video picture displayed on the display portion 11. Accordingly, the third embodiment which generates the red, green and blue output control signals only based on the signals of the present pixel without consideration of the influence of the peripheral pixels is more preferable.

As described above, according to the third embodiment, the white output control signal Wo is generated by using the signals of the peripheral pixels positioned around the present pixel in addition to the present pixel which is the calculation target. Accordingly, it is possible to display an even smoother video picture on the display portion 11. Moreover, according to the third embodiment, the red, green and blue output control signals Ro, Go, Bo are generated by using only the signals of the present pixel. Accordingly, there is an advance in that the video picture displayed on the display portion 11 will be free of discontinuous unevenness.

(Other)

Note that, the reference signal S is calculated using the green conversion signal G1 in the foregoing first embodiment, and the white reference signal Sw($i$) is calculated using the green conversion signal G1($i$) and the like in the foregoing third embodiment, but the present invention is not limited thereto. Alternatively, as substitute for the green conversion signal G1, the red conversion signal R1 or the blue conversion signal B1 may also be used for instance. However, since green has a higher contribution ratio relative to the brightness in comparison to red and blue, the green conversion signal G1 is preferably used. Moreover, alternatively, the brightness Y(=mR×R1+mG×G1+mB×B1) obtained from the red conversion signal R1, the green conversion signal G1 and the blue conversion signal B1 may also be used. Here, mR, mG, mB are well-known conversion factors. The brightness Y is suitable as the contribution ratio relative to the display brightness.

Moreover, in each of the foregoing embodiments, while the three-primary-color signals Ri, Gi, Bi are used as the input video signals, there is no limitation to the signals that are input from the outside for example. In other words, when a video signal such as NTSC other than a three-primary-color signal is input from the outside, the three-primary-color signals Ri, Gi, Bi may be separated from the video signal which is input and used as the input video signals.

Moreover, a video signal often has gamma characteristics during the filming. In this case, by converting the Ri, Gi, Bi signals into inverse gamma, a value that is linearly proportional to the light quantity may be used as the input video signal. In addition, the signal may be converted into a signal having gamma characteristics once again upon outputting that signal to the display portion 11. As a result of using a value that is proportional to the light quantity in the display device of this embodiment, it is possible to reproduce the colors even more faithfully.

Moreover, in each of the foregoing embodiments, while the respective sub pixels 21 to 24 are displayed at a maximum light quantity to obtain the brightness ratio k, the present invention is not limited thereto. For example, the respective sub pixels 21 to 24 may be displayed at a constant light quantity that is set in advance to obtain the brightness ratio k.

Moreover, in each of the foregoing embodiments, the respective formulae used in the converter 13, the upper limit value calculator 14, the lower limit value calculator 15, the first generators 16, 161, 162, the second generators 17, 171 and so on are merely examples, and additional corrections may be added based on each of the foregoing formulae. In other words, in each of the foregoing embodiments, in order to simplify the description, while the colors to be represented by the white sub pixels 24 are the same as the colors when respectively causing the red sub pixels 21, the green sub pixels 22 and the blue sub pixels 23 to emit light at the same brightness, but in reality it is rare that such conditions are ever satisfied. In fact, the brightness and the chromaticity value of the white sub pixels 24 differ from those when respectively causing the red sub pixels 21, the green sub pixels 22 and the blue sub pixels 23 to emit light at the same brightness. However, in the foregoing case, corrective calculation may be performed based on known methods such as the balance factor or matrix operation in accordance with the actual chromaticity value of the white sub pixels 24, and the present invention is not limited to the respective formulae described in each of the foregoing embodiments.

Note that the specific embodiments described above mainly include the invention configured as described below.

A display device according to the present invention has: a display portion that includes pixels each having a red sub pixel, a green sub pixel, a blue sub pixel and a white sub pixel for respectively displaying a red color, a green color, a blue color and a white color, and displays a video picture corresponding to an input video signal; a ratio storage that stores, as a brightness ratio, a quotient obtained by dividing a brightness that can be displayed with the white sub pixel by a brightness that can be displayed with three-color sub pixels of the red sub pixel, the green sub pixel and the blue sub pixel; a converter that converts the video signal using the brightness ratio stored in the ratio storage to generate a red conversion signal, a green conversion signal and a blue conversion signal; an upper limit value calculator that calculates an upper limit value of a display brightness of the white sub pixel using the red conversion signal, the green conversion signal and the blue conversion signal generated by the converter and the brightness ratio stored in the ratio storage; a lower limit value calculator that calculates a lower limit value of the display brightness of the white sub pixel using the red conversion signal, the green conversion signal and the blue conversion signal generated by the converter and the brightness ratio stored in the ratio storage; and a white control signal generator that generates a white output control signal for controlling the display brightness of the white sub pixel such that the display brightness is not more than the upper limit value calculated by the upper limit value calculator and not less than the lower limit value calculated by the lower limit value calculator, and outputs the generated white output control signal to the display portion.

According to the foregoing configuration, the display portion includes pixels each having a red sub pixel, a green sub pixel, a blue sub pixel and a white sub pixel for respectively displaying a red color, a green color, a blue color and a white color, and displays a video picture corresponding to an input video signal. The ratio storage stores, as a brightness ratio, a quotient obtained by dividing a brightness that can be displayed with the white sub pixel by a brightness that can be displayed with three-color sub pixels of the red sub pixel, the green sub pixel and the blue sub pixel. The converter converts the video signal using the brightness ratio stored in the ratio storage to generate a red conversion signal, a green conversion signal and a blue conversion signal. The upper limit value calculator calculates an upper limit value of a display brightness of the white sub pixel using the red conversion signal, the green conversion signal and the blue conversion signal generated by the converter and the brightness ratio stored in the ratio storage. The lower limit value calculator calculates a lower limit value of the display brightness of the white sub pixel using the red conversion signal, the green conversion signal and the blue conversion signal generated by the converter and the brightness ratio stored in the ratio storage. The white control signal generator generates a white output control signal for controlling the display brightness of the white sub pixel such that the display brightness is not more than the upper limit value and not less than the lower limit value, and outputs the generated white output control signal to the display portion. Accordingly, the display brightness of the white sub pixel can be controlled to be an appropriate level that is not more than the upper limit value and not less than the lower limit value. As a result, it is possible to display a video picture in which black vertical streaks are unnoticeable.

Moreover, in the foregoing display device, preferably, the display device further includes: a factor storage that stores, when at least one conversion signal among the red conversion signal, the green conversion signal and the blue conversion signal generated by the converter is used as a reference conversion signal, an adjustment factor for adjusting a ratio of a signal level representing the display brightness of the white sub pixel relative to a signal level of the reference conversion signal; and a reference signal calculator that calculates a reference signal representing the display brightness of the white sub pixel using the reference conversion signal and the adjustment factor, wherein the white control signal generator generates the white output control signal for setting the display brightness of the white sub pixel to the upper limit value calculated by the upper limit value calculator when the display brightness represented by the reference signal is more than the upper limit value, generates the white output control signal for setting the display brightness of the white sub pixel to the lower limit value calculated by the lower limit value calculator when the display brightness represented by the reference signal is less than the lower limit value, and uses the reference signal as the white output control signal when the display brightness represented by the reference signal is not more than the upper limit value and not less than the lower limit value.

According to the foregoing configuration, the factor storage stores, when at least one conversion signal among the red conversion signal, the green conversion signal and the blue conversion signal generated by the converter is used as a reference conversion signal, an adjustment factor for adjusting a ratio of a signal level representing the display brightness of the white sub pixel relative to a signal level of the reference conversion signal. The reference signal calculator calculates a reference signal representing the display brightness of the white sub pixel using the reference conversion signal and the adjustment factor. The white control signal generator generates the white output control signal for setting the display brightness of the white sub pixel to the upper limit value when the display brightness represented by the reference signal is more than the upper limit value calculated by the upper limit value calculator. The white control signal generator generates the white output control signal for setting the display brightness of the white sub pixel to the lower limit value when the display brightness represented by the reference signal is less than the lower limit value calculated by the lower limit value calculator. The white control signal generator uses the reference signal as the white output control signal when the display brightness represented by the reference signal is not more than the upper limit value and not less than the lower limit value. Accordingly, since the reference signal that is calculated using the adjustment factor for adjusting the ratio of the signal level representing the display brightness of the white sub pixel relative to the signal level of the reference conversion signal is used as the white output control signal when the display brightness represented by the reference signal is not more than the upper limit value and not less than the lower limit value, it is possible to display a video picture in which black vertical streaks are even more unnoticeable.

In the foregoing display device, preferably, when the adjustment factor stored in the factor storage is p, the adjustment factor is set to be $0<p<1$, and the reference signal calculator uses a result, which is obtained by multiplying the reference conversion signal by the adjustment factor, as the reference signal.

According to the foregoing configuration, the adjustment factor p stored in the factor storage is set to be $0<p<1$. The reference signal calculator uses a result, obtained by multiplying the reference conversion signal by the adjustment factor, as the reference signal. Accordingly, since the reference signal is calculated as a value that is smaller than the reference conversion signal, as a result of setting the adjustment factor to be an appropriate value, it is possible to display a video picture in which black vertical streaks are even more unnoticeable.

Moreover, in the foregoing display device, preferably, the display device further includes a color control signal generator that generates a red output control signal, a green output control signal and a blue output control signal for respectively controlling display brightnesses of the red sub pixel, the green sub pixel and the blue sub pixel using the white output control signal generated by the white control signal generator, the red conversion signal, the green conversion signal and the blue conversion signal generated by the converter, and the brightness ratio stored in the ratio storage, and outputs the generated red output control signal, green output control signal and blue output control signal to the display portion.

According to the foregoing configuration, the color control signal generator generates a red output control signal, a green output control signal and a blue output control signal for respectively controlling display brightnesses of the red sub pixel, the green sub pixel and the blue sub pixel using the white output control signal generated by the white control signal generator, the red conversion signal, the green conversion signal and the blue conversion signal generated by the converter, and the brightness ratio stored in the ratio storage, and outputs the generated red output control signal, green output control signal and blue output control signal to the display portion. Accordingly, since the red output control signal, the green output control signal and the blue output control signal are generated using the display brightness of the white sub pixel set to an appropriate level which is not more than the upper limit value and not less than the lower limit value, the display brightness of the red sub pixel, the green sub pixel and the blue sub pixel can also be controlled to be an appropriate level. As a result, it is possible to display a smooth video picture in which black vertical streaks are unnoticeable.

Moreover, in the foregoing display device, preferably, the display device further includes: a factor storage that stores, when at least one conversion signal among the red conversion signal, the green conversion signal and the blue conversion signal generated by the converter is used as a reference conversion signal, an adjustment factor for adjusting a ratio of a signal level representing the display brightness of the white sub pixel relative to a signal level of the reference conversion signal; and a white reference signal calculator that calculates, when a pixel which is a control target of a display brightness thereof is defined as a present pixel, a white reference signal representing a display brightness of the white sub pixel included in the present pixel using the reference conversion signal corresponding to the present pixel, the reference conversion signal corresponding to at least one peripheral pixel around the present pixel, and the adjustment factor stored in the factor storage, wherein the white control signal generator generates the white output control signal for setting the display brightness of the white sub pixel to the upper limit value calculated by the upper limit value calculator when the display brightness represented by the white reference signal is more than the upper limit value, generates the white output control signal for setting the display brightness of the white sub pixel to the lower limit value calculated by the lower limit value calculator when the display brightness represented by the white reference signal is less than the lower limit value, and uses the white reference signal as the white output control signal when the display brightness represented by the white reference signal is not more than the upper limit value and not less than the lower limit value.

According to the foregoing configuration, the factor storage stores, when at least one conversion signal among the red conversion signal, the green conversion signal and the blue conversion signal generated by the converter is used as a reference conversion signal, an adjustment factor for adjusting a ratio of a signal level representing the display brightness of the white sub pixel relative to a signal level of a reference conversion signal. The white reference signal calculator calculates, when a pixel which is a control target of a display brightness thereof is defined as a present pixel, a white reference signal representing a display brightness of the white sub pixel included in the present pixel using the reference conversion signal corresponding to the present pixel, the reference conversion signal corresponding to at least one peripheral pixel around the present pixel, and the adjustment factor stored in the factor storage. The white control signal generator generates the white output control signal for setting the display brightness of the white sub pixel to the upper limit value when the display brightness represented by the reference signal is more than the upper limit value calculated by the upper limit value calculator. The white control signal generator generates the white output control signal for setting the display brightness of the white sub pixel to the lower limit value when the display brightness represented by the reference signal is less than the lower limit value calculated by the lower limit value calculator. The white control signal generator uses the reference signal as the white output control signal when the display brightness represented by the reference signal is not more than the upper limit value and not less than the lower limit value. Accordingly, a white output control signal that gives consideration to the peripheral pixel can be obtained as the white output control signal of the white sub pixel included in the present pixel. As a result, it is possible to display, on the display portion, an even smoother video picture with higher definition.

Moreover, in the foregoing display device, preferably, the display device further includes: a color reference signal calculator that calculates a color reference signal representing the display brightness of the white sub pixel for use in controlling the red sub pixel, the green sub pixel and the blue sub pixel included in the present pixel using the reference conversion signal corresponding to the present pixel and the adjustment factor stored in the factor storage; a white correction signal generator that generates a white correction signal for use in controlling the red sub pixel, the green sub pixel and the blue sub pixel included in the present pixel using the color reference signal calculated by the color reference signal calculator, the upper limit value calculated by the upper limit value calculator, and the lower limit value calculated by the lower limit value calculator; and a color control signal generator that generates a red output control signal, a green output control signal and a blue output control signal for respectively controlling display brightnesses of the red sub pixel, the green sub pixel and the blue sub pixel included in the present pixel using the white correction signal generated by the white correction signal generator, the red conversion signal, the green conversion signal and the blue conversion signal generated by the converter, and the brightness ratio stored in the ratio storage, and outputs the generated red output control signal, green output control signal and blue output control signal to the display portion.

According to the foregoing configuration, the color reference signal calculator calculates a color reference signal representing the display brightness of the white sub pixel for use in controlling the red sub pixel, the green sub pixel and the blue sub pixel included in the present pixel using the reference conversion signal corresponding to the present pixel and the adjustment factor stored in the factor storage. The white correction signal generator generates a white correction signal for use in controlling the red sub pixel, the green sub pixel and the blue sub pixel included in the present pixel using the color reference signal calculated by the color reference signal calculator, the upper limit value calculated by the upper limit value calculator, and the lower limit value calculated by the lower limit value calculator. The color control signal generator generates a red output control signal, a green output control signal and a blue output control signal for respectively controlling display brightnesses of the red sub pixel, the green sub pixel and the blue sub pixel included in the present pixel using the white correction signal generated by the white correction signal generator, the red conversion signal, the green conversion signal and the blue conversion signal generated by the converter, and the brightness ratio stored in the ratio storage, and outputs the generated red output control signal, green output control signal and blue output control signal to the display portion. Here, when the red output control signal, the green output control signal and the blue output control signal of the present pixel are generated in consideration of the peripheral pixel as with the white output control signal, there are cases where discontinuous unevenness occurs in the video picture displayed on the display portion. However, according to the foregoing configuration, since the red output control signal, the green output control signal and the blue output control signal of the present pixels are generated without consideration to the peripheral pixel unlike the white output control signal, it is possible to display, on the display portion, a high quality video picture that is free of discontinuous unevenness.

Moreover, in the foregoing display device, preferably, the white reference signal calculator calculates an interpolation conversion signal based on interpolation calculation from the reference conversion signal corresponding to the present pixel and the reference conversion signal corresponding to the at least one peripheral pixel, and uses a product of the interpolation conversion signal and the adjustment factor as the white reference signal.

According to the foregoing configuration, the white reference signal calculator calculates an interpolation conversion signal based on interpolation calculation from the reference conversion signal corresponding to the present pixel and the reference conversion signal corresponding to the at least one peripheral pixel, and uses a product of the interpolation conversion signal and the adjustment factor as the white reference signal. Accordingly, the white reference signal of the present pixel that gives consideration to the peripheral pixel can be easily obtained based on interpolation calculation.

Moreover, in the foregoing display device, preferably, the converter generates, when the brightness ratio stored in the ratio storage is k, the red conversion signal, the green conversion signal and the blue conversion signal by respectively multiplying a red input signal, a green input signal and a blue input signal as the input video signal by (1+k), and the upper limit value calculator sets, when a maximum value of brightness that can be displayed by each of the sub pixels is defined as a brightness maximum value, a conversion signal with a minimum signal level among the red conversion signal, the green conversion signal and the blue conversion signal as the upper limit value in a case where none of the red conversion signal, the green conversion signal and the blue conversion signal exceeds the brightness maximum value, and sets the brightness maximum value as the upper limit value in a case where at least one of the red conversion signal, the green conversion signal and the blue conversion signal exceeds the brightness maximum value.

According to the foregoing configuration, the converter generates, when the brightness ratio stored in the ratio storage is k, the red conversion signal, the green conversion signal and the blue conversion signal by respectively multiplying a red input signal, a green input signal and a blue input signal as the input video signal by (1+k). The upper limit value calculator sets, when a maximum value of brightness that can be displayed by each of the sub pixels is defined as a brightness maximum value, a conversion signal with a minimum signal level among the red conversion signal, the green conversion signal and the blue conversion signal as the upper limit value in a case where none of the red conversion signal, the green conversion signal and the blue conversion signal exceeds the brightness maximum value, and sets the brightness maximum value as the upper limit value in a case where at least one of the red conversion signal, the green conversion signal and the blue conversion signal exceeds the brightness maximum value. Accordingly, the upper limit value can be suitably obtained since the minimum conversion signal among the red conversion signal, the green conversion signal and the blue conversion signal or the brightness maximum value is used as the upper limit value of the display brightness of the white sub pixel.

Moreover, in the foregoing display device, preferably, the lower limit value calculator sets, when a maximum value of brightness that can be displayed by each of the sub pixels is defined as a brightness maximum value, zero as the lower limit value in a case where none of the red conversion signal, the green conversion signal and the blue conversion signal exceeds the brightness maximum value, and sets a surplus relative to the brightness maximum value of a conversion signal which exceeds the brightness maximum value most as the lower limit value in a case where at least one of the red conversion signal, the green conversion signal and the blue conversion signal exceeds the brightness maximum value.

According to the foregoing configuration, the lower limit value calculator sets, when a maximum value of brightness that can be displayed by each of the sub pixels is defined as a brightness maximum value, zero as the lower limit value in a case where none of the red conversion signal, the green conversion signal and the blue conversion signal exceeds the brightness maximum value. Accordingly, it is possible to prevent the level of the lower limit value from becoming too high. Moreover, the lower limit value calculator sets a surplus relative to the brightness maximum value of a conversion signal which exceeds the brightness maximum value most as the lower limit value in a case where at least one of the red conversion signal, the green conversion signal and the blue conversion signal exceeds the brightness maximum value. Accordingly, the surplus in which the conversion signal exceeds the brightness maximum value, that is, the brightness that cannot be represented with the sub pixels can be compensated with the display brightness of the white sub pixel, and the increase in the brightness of the display portion by the white sub pixel can be realized favorably.

A display method according to the present invention is a display method for use in a display device having a display portion that includes pixels each having a red sub pixel, a green sub pixel, a blue sub pixel and a white sub pixel for respectively displaying a red color, a green color, a blue color and a white color, and displays a video picture corresponding to an input video signal, the method includes: a conversion step of converting the video signal using a brightness ratio, which is a quotient obtained by dividing a brightness that can be displayed with the white sub pixel by a brightness that can be displayed with three-color sub pixels of the red sub pixel, the green sub pixel and the blue sub pixel, to generate a red conversion signal, a green conversion signal and a blue conversion signal; an upper limit value calculation step of calculating an upper limit value of a display brightness of the white sub pixel using the red conversion signal, the green conversion signal and the blue conversion signal generated in the conversion step and the brightness ratio; a lower limit value calculation step of calculating a lower limit value of the display brightness of the white sub pixel using the red conversion signal, the green conversion signal and the blue conversion signal generated in the conversion step and the brightness ratio; and a white control signal generation step of generating a white output control signal for controlling the display brightness of the white sub pixel such that the display brightness is not more than the upper limit value calculated in the upper limit value calculation step and not less than the lower limit value calculated in the lower limit value calculation step, and outputting the generated white output control signal to the display portion.

According to the foregoing configuration, the conversion step converts the video signal, using a brightness ratio, to generate a red conversion signal, a green conversion signal and a blue conversion signal. The upper limit value calculation step calculates an upper limit value of a display brightness of the white sub pixel using the red conversion signal, the green conversion signal and the blue conversion signal and the brightness ratio. The lower limit value calculation step calculates a lower limit value of the display brightness of the white sub pixel using the red conversion signal, the green conversion signal and the blue conversion signal and the brightness ratio. The white control signal generation step generates a white output control signal for controlling the display brightness of the white sub pixel such that the display brightness is not more than the upper limit value and not less than the lower limit value, and outputs the generated white output control signal to the display portion. Accordingly, the display brightness of the white sub pixel can be controlled to be an appropriate level that is not more than the upper limit value and not less than the lower limit value. As a result, it is possible to display a video picture in which black vertical streaks are unnoticeable.

According to the present invention, since a white output control signal for controlling the display brightness of the white sub pixel such that the display brightness is not more than the upper limit value and not less than the lower limit value is generated and output to the display portion, the display brightness of the white sub pixel can be controlled to be an appropriate level. Accordingly, it is possible to display a video picture in which black vertical streaks are unnoticeable.

INDUSTRIAL APPLICABILITY

The display device and the display method according to the present invention are effective as a device and a method for suitably displaying color video pictures on various types of displays such as a liquid crystal display, a plasma display panel, and an organic EL display.

The invention claimed is:
1. A display device, comprising:
a display portion that includes pixels each having a red sub pixel, a green sub pixel, a blue sub pixel and a white sub pixel for respectively displaying a red color, a green color, a blue color and a white color, and displays a video picture corresponding to an input video signal;
a ratio storage that stores, as a brightness ratio, a quotient obtained by dividing a brightness that can be displayed with the white sub pixel by a brightness that can be displayed with three-color sub pixels of the red sub pixel, the green sub pixel and the blue sub pixel;

a converter that converts the video signal using the brightness ratio stored in the ratio storage to generate a red conversion signal, a green conversion signal and a blue conversion signal;

an upper limit value calculator that calculates an upper limit value of a display brightness of the white sub pixel using the red conversion signal, the green conversion signal and the blue conversion signal generated by the converter and the brightness ratio stored in the ratio storage;

a lower limit value calculator that calculates a lower limit value of the display brightness of the white sub pixel using the upper limit value calculated by the upper limit value calculator, the red conversion signal, the green conversion signal and the blue conversion signal generated by the converter and the brightness ratio stored in the ratio storage; and a white control signal generator that generates a white output control signal for controlling the display brightness of the white sub pixel such that the display brightness is not more than the upper limit value calculated by the upper limit value calculator and not less than the lower limit value calculated by the lower limit value calculator, and outputs the generated white output control signal to the display portion.

2. The display device according to claim 1, further comprising:

a factor storage that stores, when at least one conversion signal among the red conversion signal, the green conversion signal and the blue conversion signal generated by the converter is used as a reference conversion signal, an adjustment factor for adjusting a ratio of a signal level representing the display brightness of the white sub pixel relative to a signal level of the reference conversion signal; and a reference signal calculator that calculates a reference signal representing the display brightness of the white sub pixel using the reference conversion signal and the adjustment factor, wherein the white control signal generator generates the white output control signal for setting the display brightness of the white sub pixel to the upper limit value calculated by the upper limit value calculator when the display brightness represented by the reference signal is more than the upper limit value, generates the white output control signal for setting the display brightness of the white sub pixel to the lower limit value calculated by the lower limit value calculator when the display brightness represented by the reference signal is less than the lower limit value, and uses the reference signal as the white output control signal when the display brightness represented by the reference signal is not more than the upper limit value and not less than the lower limit value.

3. The display device according to claim 2, wherein, when the adjustment factor stored in the factor storage is p, the adjustment factor is set to be $0 < p < 1$, and wherein the reference signal calculator uses a result, which is obtained by multiplying the reference conversion signal by the adjustment factor, as the reference signal.

4. The display device according to claim 1, further comprising:

a factor storage that stores, when at least one conversion signal among the red conversion signal, the green conversion signal and the blue conversion signal generated by the converter is used as a reference conversion signal, an adjustment factor for adjusting a ratio of a signal level representing the display brightness of the white sub pixel relative to a signal level of the reference conversion signal; and a white reference signal calculator that calculates, when a pixel which is a control target of a display brightness thereof is defined as a present pixel, a white reference signal representing a display brightness of the white sub pixel included in the present pixel using the reference conversion signal corresponding to the present pixel, the reference conversion signal corresponding to at least one peripheral pixel around the present pixel, and the adjustment factor stored in the factor storage, wherein the white control signal generator generates the white output control signal for setting the display brightness of the white sub pixel to the upper limit value calculated by the upper limit value calculator when the display brightness represented by the white reference signal is more than the upper limit value, generates the white output control signal for setting the display brightness of the white sub pixel to the lower limit value calculated by the lower limit value calculator when the display brightness represented by the white reference signal is less than the lower limit value, and uses the white reference signal as the white output control signal when the display brightness represented by the white reference signal is not more than the upper limit value and not less than the lower limit value.

5. The display device according to claim 4, further comprising:

a color reference signal calculator that calculates a color reference signal representing the display brightness of the white sub pixel for use in controlling the red sub pixel, the green sub pixel and the blue sub pixel included in the present pixel using the reference conversion signal corresponding to the present pixel and the adjustment factor stored in the factor storage;

a white correction signal generator that generates a white correction signal for use in controlling the red sub pixel, the green sub pixel and the blue sub pixel included in the present pixel using the color reference signal calculated by the color reference signal calculator, the upper limit value calculated by the upper limit value calculator, and the lower limit value calculated by the lower limit value calculator; and a color control signal generator that generates a red output control signal, a green output control signal and a blue output control signal for respectively controlling display brightnesses of the red sub pixel, the green sub pixel and the blue sub pixel included in the present pixel using the white correction signal generated by the white correction signal generator, the red conversion signal, the green conversion signal and the blue conversion signal generated by the converter, and the brightness ratio stored in the ratio storage, and outputs the generated red output control signal, green output control signal and blue output control signal to the display portion.

6. The display device according to claim 4, wherein the white reference signal calculator calculates an interpolation conversion signal based on interpolation calculation from the reference conversion signal corresponding to the present pixel and the reference conversion signal corresponding to the at least one peripheral pixel, and uses a product of the interpolation conversion signal and the adjustment factor as the white reference signal.

7. A display device, comprising:
a display portion that includes pixels each having a red sub pixel, a green sub pixel, a blue sub pixel and a white sub pixel for respectively displaying a red color, a green color, a blue color and a white color, and displays a video picture corresponding to an input video signal;
a ratio storage that stores, as a brightness ratio, a quotient obtained by dividing a brightness that can be displayed with the white sub pixel by a brightness that can be displayed with three-color sub pixels of the red sub pixel, the green sub pixel and the blue sub pixel;
a converter that converts the video signal using the brightness ratio stored in the ratio storage to generate a red conversion signal, a green conversion signal and a blue conversion signal;
an upper limit value calculator that calculates an upper limit value of a display brightness of the white sub pixel using the red conversion signal, the green conversion signal and the blue conversion signal generated by the converter and the brightness ratio stored in the ratio storage;
a lower limit value calculator that calculates a lower limit value of the display brightness of the white sub pixel using the red conversion signal, the green conversion signal and the blue conversion signal generated by the converter and the brightness ratio stored in the ratio storage;
a white control signal generator that generates a white output control signal for controlling the display brightness of the white sub pixel such that the display brightness is not more than the upper limit value calculated by the upper limit value calculator and not less than the lower limit value calculated by the lower limit value calculator, and outputs the generated white output control signal to the display portion; and
a color control signal generator that generates a red output control signal, a green output control signal and a blue output control signal for respectively controlling display brightnesses of the red sub pixel, the green sub pixel and the blue sub pixel using the white output control signal generated by the white control signal generator, the red conversion signal, the green conversion signal and the blue conversion signal generated by the converter, and the brightness ratio stored in the ratio storage, and outputs the generated red output control signal, green output control signal and blue output control signal to the display portion.

8. A display device, comprising:
a display portion that includes pixels each having a red sub pixel, a green sub pixel, a blue sub pixel and a white sub pixel for respectively displaying a red color, a green color, a blue color and a white color, and displays a video picture corresponding to an input video signal;
a ratio storage that stores, as a brightness ratio, a quotient obtained by dividing a brightness that can be displayed with the white sub pixel by a brightness that can be displayed with three-color sub pixels of the red sub pixel, the green sub pixel and the blue sub pixel;
a converter that converts the video signal using the brightness ratio stored in the ratio storage to generate a red conversion signal, a green conversion signal and a blue conversion signal;
an upper limit value calculator that calculates an upper limit value of a display brightness of the white sub pixel using the red conversion signal, the green conversion signal and the blue conversion signal generated by the converter and the brightness ratio stored in the ratio storage;
a lower limit value calculator that calculates a lower limit value of the display brightness of the white sub pixel using the red conversion signal, the green conversion signal and the blue conversion signal generated by the converter and the brightness ratio stored in the ratio storage;
a white control signal generator that generates a white output control signal for controlling the display brightness of the white sub pixel such that the display brightness is not more than the upper limit value calculated by the upper limit value calculator and not less than the lower limit value calculated by the lower limit value calculator, and outputs the generated white output control signal to the display portion; and
wherein the converter generates, when the brightness ratio stored in the ratio storage is k, the red conversion signal, the green conversion signal and the blue conversion signal by respectively multiplying a red input signal, a green input signal and a blue input signal as the input video signal by (1 +k), and
wherein the upper limit value calculator sets, when a maximum value of brightness that can be displayed by each of the sub pixels is defined as a brightness maximum value, a conversion signal with a minimum signal level among the red conversion signal, the green conversion signal and the blue conversion signal as the upper limit value in a case where none of the red conversion signal, the green conversion signal and the blue conversion signal exceeds the brightness maximum value, and sets the brightness maximum value as the upper limit value in a case where at least one of the red conversion signal, the green conversion signal and the blue conversion signal exceeds the brightness maximum value.

9. A display device, comprising:
a display portion that includes pixels each having a red sub pixel, a green sub pixel, a blue sub pixel and a white sub pixel for respectively displaying a red color, a green color, a blue color and a white color, and displays a video picture corresponding to an input video signal;
a ratio storage that stores, as a brightness ratio, a quotient obtained by dividing a brightness that can be displayed with the white sub pixel by a brightness that can be displayed with three-color sub pixels of the red sub pixel, the green sub pixel and the blue sub pixel;
a converter that converts the video signal using the brightness ratio stored in the ratio storage to generate a red conversion signal, a green conversion signal and a blue conversion signal;
an upper limit value calculator that calculates an upper limit value of a display brightness of the white sub pixel using the red conversion signal, the green conversion signal and the blue conversion signal generated by the converter and the brightness ratio stored in the ratio storage;
a lower limit value calculator that calculates a lower limit value of the display brightness of the white sub pixel using the red conversion signal, the green conversion signal and the blue conversion signal generated by the converter and the brightness ratio stored in the ratio storage;
a white control signal generator that generates a white output control signal for controlling the display brightness of the white sub pixel such that the display brightness is not more than the upper limit value calculated by the upper limit value calculator and not less than the lower limit value calculated by the lower limit value calculator, and outputs the generated white output control signal to the display portion; and wherein the lower limit value calculator sets, when a maximum value of brightness that can be displayed by each of the sub pixels is defined as a brightness maximum value, zero as the lower limit value in a case where none of the red conversion signal, the green conversion signal and the blue conversion signal exceeds the brightness maximum value, and sets a surplus relative to the brightness maximum value of a conversion signal which exceeds the brightness maximum value most as the lower limit value in a case where at least one of the red conversion signal, the green conversion signal and the blue conversion signal exceeds the brightness maximum value.

10. A display method for use in a display device having a display portion that includes pixels each having a red sub pixel, a green sub pixel, a blue sub pixel and a white sub pixel for respectively displaying a red color, a green color, a blue color and a white color, and displays a video picture corresponding to an input video signal, the method comprising:

a conversion step of converting the video signal using a brightness ratio, which is a quotient obtained by dividing a brightness that can be displayed with the white sub pixel by a brightness that can be displayed with three-color sub pixels of the red sub pixel, the green sub pixel and the blue sub pixel, to generate a red conversion signal, a green conversion signal and a blue conversion signal;

an upper limit value calculation step of calculating an upper limit value of a display brightness of the white sub pixel using the red conversion signal, the green conversion signal and the blue conversion signal generated in the conversion step and the brightness ratio;

a lower limit value calculation step of calculating a lower limit value of the display brightness of the white sub pixel using the upper limit value calculated by the upper limit value calculation step, the red conversion signal, the green conversion signal and the blue conversion signal generated in the conversion step and the brightness ratio; and a white control signal generation step of generating a white output control signal for controlling the display brightness of the white sub pixel such that the display brightness is not more than the upper limit value calculated in the upper limit value calculation step and not less than the lower limit value calculated in the lower limit value calculation step, and outputting the generated white output control signal to the display portion.

* * * * *